(12) United States Patent
Huang et al.

(10) Patent No.: US 12,488,826 B2
(45) Date of Patent: Dec. 2, 2025

(54) COUNTING CONTROL CIRCUIT, METHOD FOR COUNTING CONTROL CIRCUIT AND SEMICONDUCTOR MEMORY WITH COUNTING CONTROL CIRCUIT

(71) Applicant: CHANGXIN MEMORY TECHNOLOGIES, INC., Hefei (CN)

(72) Inventors: Zequn Huang, Hefei (CN); Kai Sun, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 217 days.

(21) Appl. No.: 18/452,518

(22) Filed: Aug. 18, 2023

(65) Prior Publication Data

US 2024/0119987 A1 Apr. 11, 2024

Related U.S. Application Data

(63) Continuation of application No. PCT/CN2022/126387, filed on Oct. 20, 2022.

(30) Foreign Application Priority Data

Oct. 8, 2022 (CN) .......................... 202211230198.3

(51) Int. Cl.
G11C 11/406 (2006.01)
G11C 11/4072 (2006.01)
(Continued)

(52) U.S. Cl.
CPC .... G11C 11/40615 (2013.01); G11C 11/4072 (2013.01); G11C 11/4076 (2013.01); H03K 23/002 (2013.01)

(58) Field of Classification Search
CPC .......... G11C 11/40615; G11C 11/4072; G11C 11/4076; G11C 11/40611;
(Continued)

(56) References Cited

U.S. PATENT DOCUMENTS 5,734,271 A * 3/1998 Grishakov ........... H03K 17/166
326/26
5,751,655 A 5/1998 Yamazaki
(Continued)

FOREIGN PATENT DOCUMENTS

| CN | 104283556 A | 1/2015 |
| CN | 108733135 A | 11/2018 |

(Continued)

OTHER PUBLICATIONS

Micro Computer (Year: 1989).*
(Continued)

Primary Examiner — Sultana Begum
(74) Attorney, Agent, or Firm — Syncoda LLC; Feng Ma

(57) ABSTRACT

A counting control circuit includes a logic control circuit and a counting statistic circuit, an output terminal of the logic control circuit is connected to a clock terminal of the counting statistic circuit. The logic control circuit is configured to receive a first clock signal and a first identification signal, and generate a counting clock signal according to the first clock signal under a control of the first identification signal. The counting statistic circuit is configured to receive the counting clock signal, count according to the counting clock signal, and generate the first identification signal which indicates a generation of a command signal for performing a first operation, here, the first identification signal is in a valid state when a counting value meets a preset condition.

19 Claims, 16 Drawing Sheets

(51) Int. Cl.
*G11C 11/4076* (2006.01)
*H03K 23/00* (2006.01)

(58) Field of Classification Search
CPC ... G11C 2029/0409; G11C 7/02; G11C 7/222; H03K 23/002
See application file for complete search history.

(56) References Cited

U.S. PATENT DOCUMENTS

| | | | |
|---|---|---|---|
| 5,874,839 | A | 2/1999 | Wakimoto |
| 9,602,112 | B2 | 3/2017 | Seo |
| 10,573,369 | B2 | 2/2020 | Lee |
| 10,817,371 | B2 | 10/2020 | Rooney |
| 10,971,206 | B2 | 4/2021 | Lee |
| 10,971,207 | B2 | 4/2021 | Lee |
| 11,145,351 | B2 | 10/2021 | Lim |
| 11,249,843 | B2 | 2/2022 | Song |
| 11,294,762 | B2 | 4/2022 | Rooney |
| 11,604,694 | B2 | 3/2023 | Rooney |
| 2009/0243677 | A1* | 10/2009 | Becker .................. H03L 7/0814 327/158 |
| 2015/0015310 | A1 | 1/2015 | Seo |
| 2015/0280721 | A1 | 10/2015 | Seo |
| 2018/0294028 | A1* | 10/2018 | Lee .................. G11C 11/40611 |
| 2020/0160903 | A1 | 5/2020 | Lee |
| 2020/0160904 | A1 | 5/2020 | Lee |
| 2020/0210278 | A1 | 7/2020 | Rooney |
| 2021/0042185 | A1 | 2/2021 | Rooney |
| 2021/0142848 | A1 | 5/2021 | Lim |
| 2022/0197740 | A1 | 6/2022 | Rooney |
| 2024/0211344 | A1* | 6/2024 | Bains .................. G11C 29/028 |

FOREIGN PATENT DOCUMENTS

| | | | |
|---|---|---|---|
| CN | 111381999 | A | 7/2020 |
| CN | 112783686 | A | 5/2021 |
| KR | 890004404 | B1 * | 11/1989 |

OTHER PUBLICATIONS

International Search Report in the international application No. PCT/CN2022/126387, mailed on Apr. 23, 2023. 6 Pages with English translation.

* cited by examiner

COUNTING CONTROL CIRCUIT, METHOD FOR COUNTING CONTROL CIRCUIT AND SEMICONDUCTOR MEMORY WITH COUNTING CONTROL CIRCUIT

CROSS-REFERENCE TO RELATED APPLICATIONS

This is a continuation of International Patent Application No. PCT/CN2022/126387 filed on Oct. 20, 2022, which is claims priority to Chinese Patent Application No. 202211230198.3 filed on Oct. 8, 2022. The disclosures of the above-referenced applications are hereby incorporated by reference in their entirety.

BACKGROUND

With the continuous development of semiconductor technologies, people have put forward higher and higher requirements on data transmission speed when they manufacture and use devices such as computers or the like. In order to obtain a faster data transmission speed, a series of devices such as a memory where data may be transmitted at Double Data Rate (DDR) or the like have emerged.

In the related art, errors may occur in the memory due to faster and faster transmission speed of the memory, row hammer or some other reasons. This requires error check of the memory and timely correction of the detected errors. Dynamic Random Access Memory (DRAM) is taken as an example, a complete Error Check and Scrub (ECS) need to be performed on the DRAM at least every 24 hours. However, with regard to ECS in the related art, there may be a situation where a complete ECS operation cannot be completed within 24 hours, or even additional power consumption may be generated, which affects the performance of the memory.

SUMMARY

The disclosure relates to the technical field of integrated circuits, and in particular to a counting control circuit and method, and a semiconductor memory.

Embodiments of the disclosure provide a counting control circuit, a counting control method, and a semiconductor memory.

According to a first aspect, an embodiment of the disclosure provides a counting control circuit. The counting control circuit includes a logic control circuit and a counting statistic circuit, an output terminal of the logic control circuit is connected to a clock terminal of the counting statistic circuit.

The logic control circuit is configured to receive a first clock signal and a first identification signal, and generate a counting clock signal according to the first clock signal under a control of the first identification signal.

The counting statistic circuit is configured to receive the counting clock signal, count according to the counting clock signal, and generate the first identification signal. The first identification signal indicates a generation of a command signal for performing a first operation, and the first identification signal is in a valid state under a condition that a counting value meets a preset condition.

According to a second aspect, an embodiment of the disclosure provides a counting control method. The method includes the following operations.

A first clock signal and a first identification signal are received, and a counting clock signal is generated according to the first clock signal under a control of the first identification signal.

Counting is performed according to the counting clock signal, and the first identification signal is generated, the first identification signal indicates a generation of a command signal for performing a first operation, here, the first identification signal is in a valid state under a condition that a counting value meets a preset condition.

According to a third aspect, an embodiment of the disclosure provides a semiconductor memory, the semiconductor memory includes the counting control circuit. The counting control circuit includes a logic control circuit and a counting statistic circuit, an output terminal of the logic control circuit is connected to a clock terminal of the counting statistic circuit.

The logic control circuit is configured to receive a first clock signal and a first identification signal, and generate a counting clock signal according to the first clock signal under a control of the first identification signal.

The counting statistic circuit is configured to receive the counting clock signal, count according to the counting clock signal, and generate the first identification signal. The first identification signal indicates a generation of a command signal for performing a first operation, and the first identification signal is in a valid state under a condition that a counting value meets a preset condition.

DETAILED DESCRIPTION

Figure 1:
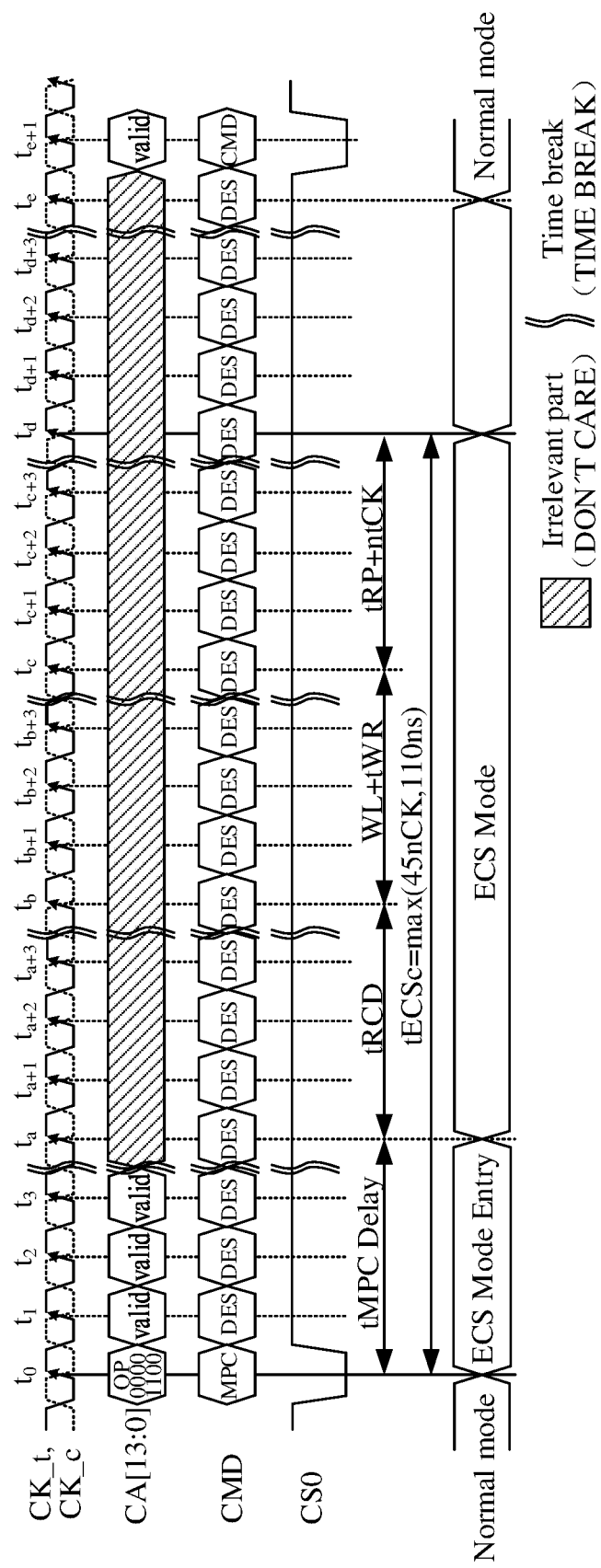
FIG. 1 is a schematic diagram of signal timing sequence in an ECS mode.

Technical solutions in the embodiments of the disclosure will be clearly and completely described below with reference to the drawings in the embodiments of the disclosure. It may be understood that specific embodiments described here are only intended to explain relevant disclosures, rather than limiting the disclosures. Furthermore, it should also be noted that only portions related to the relevant disclosures are shown in the drawings, to facilitate descriptions.

Unless otherwise defined, all technical and scientific terms used here have the same meanings as those usually understood by technicians of the technical field to which the disclosure belongs. The terms used here are only intended to describe the embodiments of the disclosure, and are not intended to limit the disclosure.

In the following descriptions, reference is made to "some embodiments" which describe a subset of all possible embodiments, however, it may be understood that "some embodiments" may be the same subset or different subsets of all possible embodiments, and may be combined with each other without conflict.

It should be noted that terms "first\second\third" involved in the embodiments of the disclosure are only intended to distinguish similar objects and do not represent a particular order of the objects, and it may be understood that "first\second\third" may be interchanged in a particular order or sequence if allowable, so that the embodiments of the disclosure described here may be implemented in an order other than that illustrated or described here.

Nouns and terms involved in the embodiments of the disclosure are explained first, before further describing the embodiments of the disclosure in detail. The nouns and terms involved in the embodiments of the disclosure are applicable to the following explanations.

DRAM: Dynamic Random Access Memory;
SDRAM: Synchronous Dynamic Random Access Memory;
DDR: Double Data Rate;
DDR5 SPEC: DDR5 Specification;
MPC: Multi-Purpose Command;
ECS: Error Check and Scrub.

DDR5 DRAM is taken as an example, ECS modes may be divided into an automatic ECS operation mode and a manual ECS operation mode. In the manual ECS operation mode, an ECS command signal is generated by an MPC command transmitted by a memory controller. In the automatic ECS operation mode, an ECS command signal may be generated by refresh or self-refresh. Although a specific MPC command may generate an ECS operation, there is no MPC command in the automatic ECS operation mode. Therefore, an ECS command for an automatic ECS operation needs to be generated by refresh and self-refresh. Specifically, in the embodiments of the disclosure, a complete ECS operation needs to be performed on the DRAM at least within 24 hours. Therefore, planning of time of the ECS operation is required. In order to perform a complete ECS on the DRAM, error check need to be performed on all rows, columns (Cols), banks (BAs) and bank groups (BGs) in the DRAM here. Therefore, the ECS operation need to be performed multiple times within 24 hours, an average time interval between ECS operations is tECSint. A 16 Gigabyte (Gb) memory is taken as an example, the average time interval is about 644 microseconds (s). The time interval is a minimum time to complete ECS operations of the whole 16 Gb memory within 24 hours, and a specific calculation formula is 24 hours×60 minutes/hour×60 seconds/minute/ $2^{(3+2+16+6)}$. $2^3$ is a number of BGs, $2^2$ is a number of banks in each BG, $2^{16}$ is a number of rows in a bank, and $2^6$ is a number of operations on a row which need to access to all Cols. FIG. 1 shows a schematic diagram of signal timing sequence in an ECS mode. As shown in FIG. 1, CK_t and CK_c represent a pair of complementary clock signals, CA[13:0] represents a command address signal, CMD represents a command signal, CS0 represents a chip select signal which is valid at low-level, valid represents a valid command address, and DES represents an invalid command. At time t0, the command signal at this point is an MPC command, s corresponding command address is OP00001100. At this point, it will switch from a Normal Mode to an ECS Mode Entry. Then, it is in an ECS mode after a delay period (such as tMPC Delay). With regard to the ECS mode, when an ECS operation is performed, an order of self-generated command signals within the DRAM is an active signal (ACT), a read signal (RD), a write signal (WR), and a precharge signal (PRE). tRCD represents a time interval between ACT and RD, WL represents a time interval between RD and WR, and tWR represents a time interval between WR and PRE. That is, DDR5 SPEC specifies that a minimum time during performing the ECS operation each time is tECSc. In this period, detection and modification of internal read-write errors need to be performed by an ECS operation on a certain Col corresponding to a certain row in a certain bank in a certain BG. Therefore, a self-generation of internal commands ACT-RD-WR-PRE is required, and a timing sequence of tRCD, WL and tWR is met between every two adjacent commands, so that an internal operation of performing an ECS command may be completed within tECSc. Exemplarily, Table 1 shows time specifications of an average ECS interval under the 16 Gb memory.

TABLE 1

| Configuration | Value |
| --- | --- |
| x4, x8, x16 | 644 μs |

It may be understood that a number of refresh commands need to be counted in a period of the average ECS interval.

When the count reaches a preset value, a next refresh command will be stolen, to be used as the ECS command for the automatic ECS operation. An average time interval between refresh commands is tREFI. Exemplarily, a value of tREFI in DDR5 may be 3.9 s, please refer to Table 2 for the details. It is assumed that a value of tECSint is 644 s and a value of tREFI may be 3.9 s, then a number of required refresh commands is 644/3.9=165. Therefore, counting at least 165 refresh commands is required to generate the ECS command.

TABLE 2

| Time interval between refresh commands (REF_AB to REF_AB) | Value |
| --- | --- |
| tREFI | 3.9 μs |

Figure 2:
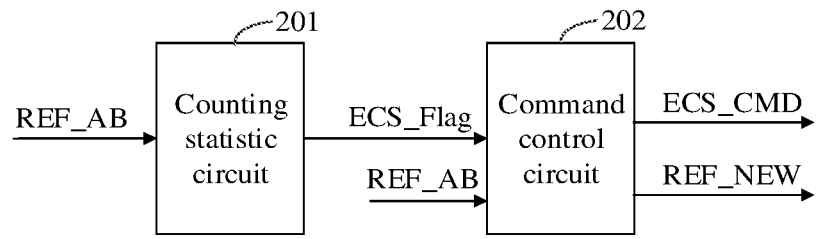
FIG. 2 is a schematic diagram of a framework for generating an ECS command.

Furthermore, FIG. 2 shows a schematic diagram of a framework for generating an ECS command. As shown in FIG. 2, the framework may include a counting statistic circuit 201 and a command control circuit 202. The counting statistic circuit 201 outputs a counting signal CNT<N:0> by counting a number of refresh commands REF_AB; when the count reaches a preset value (such as 165), an ECS identification signal ECS_Flag may be generated; finally, when the ECS_Flag signal is in a valid state, the command control circuit 202 may steal a next refresh command REF_AB to generate an ECS command signal ECS_CMD.

Based on the framework shown in FIG. 2, counting a number of refresh commands is required in the automatic ECS operation mode, and then a refresh command is stolen to generate the ECS command. Here, the refresh command REF_AB may be used as a clock of a first stage of the counting circuit or an input of the command control circuit. The preset value 165 set for counting is taken as an example, when the count reaches the preset value, a decoding circuit generates an ECS_Flag signal through decoding, and then a next refresh command is stolen via the command control circuit to be used as the ECS command. At the same time, the corresponding stolen refresh command will disappear, and other refresh commands are not affected. When the counting is completed, the counting circuit may be reset after the ECS command is generated, to start re-counting.

However, in the related art, the refresh command REF_AB is used as a clock signal of the counting circuit. When the controller refreshes by REFsb or other manners, the count will not increase at this point, and a lag occurs to the ECS command indicating for performing the ECS operation, therefore a situation where the complete ECS operation cannot be completed within 24 hours may occur. Furthermore, when the ECS_Flag signal is generated, the current counting circuit may still count REF_AB continuously, and may not re-count until a counting reset signal ECS_RST is received, resulting in a conflict time occurred between ECS_RST and operation of the counting circuit, while additional power consumption will be generated.

On the above basis, an embodiment of the disclosure provides a counting control circuit, and the counting control circuit includes a logic control circuit and a counting statistic circuit. After receiving a first clock signal, the logic control circuit performs a logical operation in combination with a first identification signal, to obtain a counting clock signal for counting, and a first identification signal may be generated according to the counting clock signal, to generate a command signal for performing a first operation. At this point, a generation of commands for performing ECS operations is not limited by refresh commands, which solves a technical problem that counting may be performed by means of REF_AB only to generate ECS command signals in the related art, and may ensure that the complete ECS operation is completed within 24 hours. Furthermore, a logical relationship is present between the counting clock signal and the first identification signal, the counting statistic circuit may be controlled to stop counting or not according to a state of the first identification signal, thereby achieving a purpose of reducing power consumption and finally improving performance of the memory.

The embodiments of the disclosure will be described in detail below with reference to the drawings.

Figure 3:
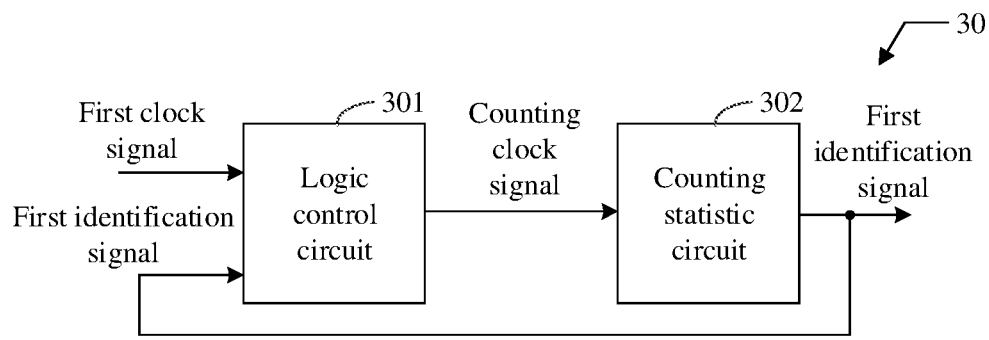
FIG. 3 is a first schematic diagram of a compositional structure of a counting control circuit according to an embodiment of the disclosure.

In an embodiment of the disclosure, with reference to FIG. 3, a schematic diagram of a compositional structure of a counting control circuit 30 according to an embodiment of the disclosure is shown. As shown in FIG. 3, the counting control circuit 30 may include a logic control circuit 301 and a counting statistic circuit 302, an output terminal of the logic control circuit 301 is connected to a clock terminal of the counting statistic circuit 302.

The logic control circuit 301 is configured to receive a first clock signal and a first identification signal, and generate a counting clock signal according to the first clock signal under a control of the first identification signal.

The counting statistic circuit 302 is configured to receive the counting clock signal, count according to the counting clock signal, and generate the first identification signal which indicates a generation of a command signal for performing a first operation, here, the first identification signal is in a valid state under a condition that a counting value meets a preset condition.

It should be noted that in the embodiment of the disclosure, the counting control circuit 30 may be applied to relevant circuits performing ECS operations, and specifically, may be applied to all counting circuit performing automatic ECS operations, but is not limited thereto, and may also be applied to other circuits generating command signals by counting.

DDR5 DRAM is taken as an example, since the DRAM requires a complete ECS to be performed at least within 24 hours, a time interval for generating command signals is planned by the counting statistic circuit 302, to ensure that all ECSs of the memory may be completed within 24 hours. That is, the counting statistic circuit 302 counts the received counting clock signal, and makes the first identification signal in the valid state when the counting value meets the preset condition, to generate the command signal for performing the first operation. In this way, when the first operation is an ECS operation, it may ensure that all ECSs are completed within 24 hours according to the command signal generated by the counting control circuit 30.

It should also be noted that in the embodiment of the disclosure, since the counting clock signal is generated by performing a logical operation on the first clock signal and the first identification signal, and the first clock signal may be a clock signal with a fixed frequency, limitations of refresh commands are not considered during counting at this point, thereby solving a problem that the complete ECS operation cannot be completed within 24 hours since the controller transmits other refresh commands except REF_AB (when performing counting and generating ECS command signal by using the REF_AB command) in the related art. Furthermore, a logical relationship is present between the counting clock signal and the first identification signal, therefore when the counting clock signal is used for counting, the counting statistic circuit 302 is controlled to stop counting or not according to a state of the first identification signal, thereby achieving a purpose of reducing power consumption and finally improving performance of the memory.

In some embodiments, the logic control circuit 301 is configured to: under a condition that the first identification signal is in an invalid state, generate the counting clock signal according to the first clock signal, and make the counting statistic circuit 302 to count the counting clock signal; or under a condition that the first identification signal is in the valid state, shield the first clock signal, to prevent a generation of the counting clock signal, and make the counting statistic circuit 302 to stop counting.

That is, with regard to the logic control circuit 301, a logical relationship is present between the counting clock signal and the first identification signal. If the first identification signal is in the invalid state, the counting clock signal is generated according to the first clock signal at this point, to control the counting statistic circuit 302 to count according to the counting clock signal; otherwise, if the first identification signal is in the valid state, a generation of the counting clock signal is prevented at this point, so that the counting statistic circuit 302 stops working, thereby achieving a purpose of reducing power consumption.

Figure 4:
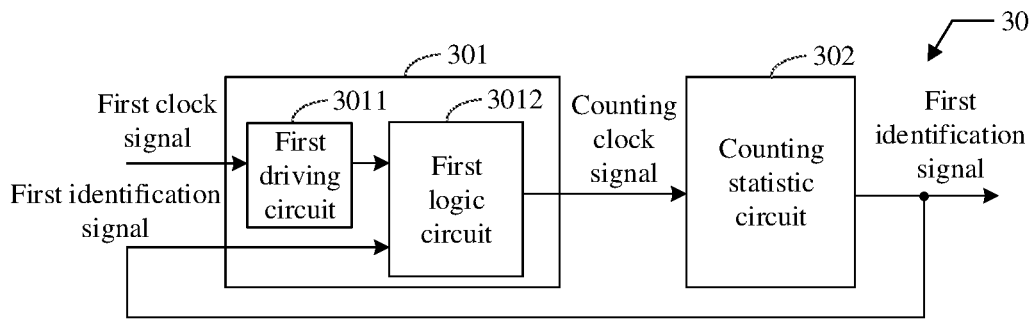
FIG. 4 is a second schematic diagram of a compositional structure of a counting control circuit according to an embodiment of the disclosure.

Furthermore, in some embodiments, with regard to the logic control circuit 301, based on the counting control circuit 30 shown in FIG. 3, with reference to FIG. 4, the logic control circuit 301 may include a first driving circuit 3011 and a first logic circuit 3012.

The first driving circuit 3011 is configured to perform driving on the first clock signal, to obtain a first intermediate signal.

The first logic circuit 3012 is configured to perform a logical operation on the first intermediate signal and the first identification signal, to obtain the counting clock signal.

Here, the first clock signal may be represented by ECS_CLK, the first identification signal may be represented by ECS_Flag, and the counting clock signal may be represented by CNT_CLK.

It should be noted that in the embodiments of the disclosure, the first driving circuit 3011 may include an even number of cascaded first NOT gates, to enhance driving capability of the first clock signal. However, due to a delay of the first NOT gate itself, it may also delay the first clock signal to a certain extent simultaneously. Exemplarily, the number of first NOT gates included in the first driving circuit 3011 may be 2, 4, 6, 8, etc., which is not specifically limited here.

Figure 5:
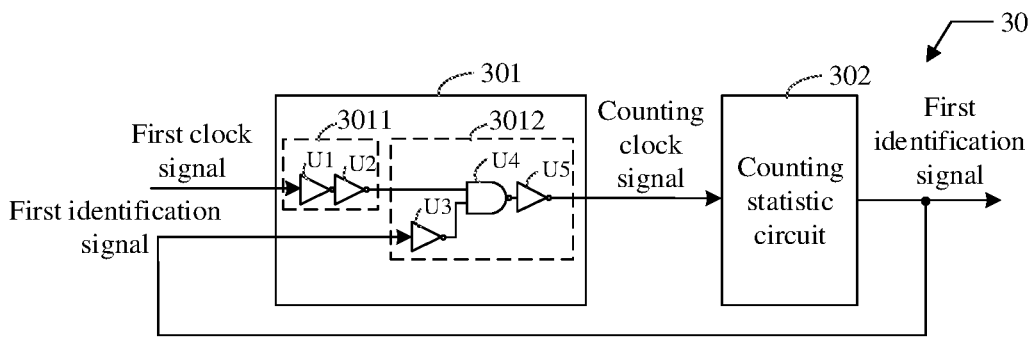
FIG. 5 is a third schematic diagram of a compositional structure of a counting control circuit according to an embodiment of the disclosure.

In some embodiments, based on the counting control circuit 30 shown in FIG. 4, with reference to FIG. 5, the first driving circuit 3011 may include two first NOT gates (U1 and U2).

It should be noted that in the embodiments of the disclosure, with regard to the two first NOT gates, an input terminal of U1 (used as an input terminal of the first driving circuit 3011) is configured to receive the first clock signal, an output terminal of U1 is connected to an input terminal of U2, and an output terminal of U2 (used as an output terminal of the first driving circuit 3011) is configured to output the first intermediate signal.

It should also be noted that in the embodiments of the disclosure, the first driving circuit 3011 may be composed of two NOT gates, or may be composed of one or more buffers, or the like. Here, internal structures of the first driving circuit 3011 are not specifically limited, as long as the first driving circuit 3011 may play a role of driving on the first clock signal.

Furthermore, in some embodiments, with regard to the first logic circuit 3012, with reference to FIG. 5, the first logic circuit 3012 may include a first delay inverting circuit U3, a first NAND gate U4, and a second NOT gate U5.

The first delay inverting circuit U3 is configured to delay and invert the first identification signal, to obtain a second intermediate signal.

The first NAND gate U4 is configured to perform a NAND logical operation on the first intermediate signal and the second intermediate signal, to obtain a third intermediate signal.

The second NOT gate U5 is configured to perform a NOT logical operation on the third intermediate signal, to obtain the counting clock signal.

It should be noted that in the embodiments of the disclosure, an input terminal of the first delay inverting circuit U3 is configured to receive the first identification signal, and an output terminal of the first delay inverting circuit U3 is connected to a first input terminal of the first NAND gate U4; the input terminal of the first driving circuit 3011 is configured to receive the first clock signal, the output terminal of the first driving circuit 3011 is connected to a second input terminal of the first NAND gate U4, an output terminal of the first NAND gate U4 is connected to an input terminal of the second NOT gate U5, and an output terminal of the second NOT gate U5 is configured to output the counting clock signal.

It should also be noted that in the embodiments of the disclosure, the first delay inverting circuit U3 may include an odd number of cascaded third NOT gates, to play a role of delaying and inverting the first identification signal. Exemplarily, the number of third NOT gates included in the first delay inverting circuit U3 may be 1, 3, 5, 7, etc., which is not limited in any way here. Specifically, as shown in FIG. 5, the first delay inverting circuit U3 includes only one third NOT gate, and the first identification signal may be delayed and inverted by the third NOT gate at this point.

It should also be noted that in the embodiments of the disclosure, the first logic circuit 3012 may achieve a function of generating the counting clock signal according to the first identification signal. The first logic circuit 3012 may be a logic device combination composed of two NOT gates and one NAND gate, or a logic device combination composed of one NOT gate and one AND gate, or the like. Here, internal structures of the first logic circuit 3012 are not specifically limited, as long as same functions of the first logic circuit 3012 may be achieved.

It may be understood that the counting statistic circuit 302 may not only count the counting clock signal, but also reset the count to re-count. Therefore, in some embodiments, the counting statistic circuit 302 is further configured to receive a counting reset signal, reset the count according to the counting reset signal, and put the first identification signal in an invalid state.

It should be noted that in the embodiments of the disclosure, reset of the counting statistic circuit 302 need to be completed before re-counting starts, that is, the counting statistic circuit 302 need to receive the counting reset signal first. Here, a time interval between a moment when the counting reset signal is generated and a moment when the counting clock signal is generated may be adjusted by the first delay inverting circuit U3. According to the time interval, it may ensure that re-counting is started according to the counting clock signal, after reset of the counting statistic circuit 302 is completed.

It should also be noted that the invalid state of the first identification signal may be that after receiving the counting reset signal, the counting statistic circuit 302 resets the count according to the counting reset signal, and resets the first identification signal to the invalid state according to a resetting counting value. Or, the invalid state of the first identification signal may be that the first identification signal indicates a generation of a first command signal for performing the ECS operation, and then to able the first identification signal in the invalid state at the same time.

In this way, in the embodiments of the disclosure, the first identification signal may be in the valid state or in the invalid state. The counting statistic circuit 302 may generate the first identification signal in the valid state after every a time period (that is, the counting value reaches the preset condition) to indicate a generation of the first command signal for performing the ECS operation, while put the first identification signal in the invalid state after generating the first command signal. When the first identification signal is in the invalid state, the counting clock signal may be generated by the logic control circuit 301, and the counting statistic circuit 302 may count according to the counting clock signal at this point.

Figure 6:
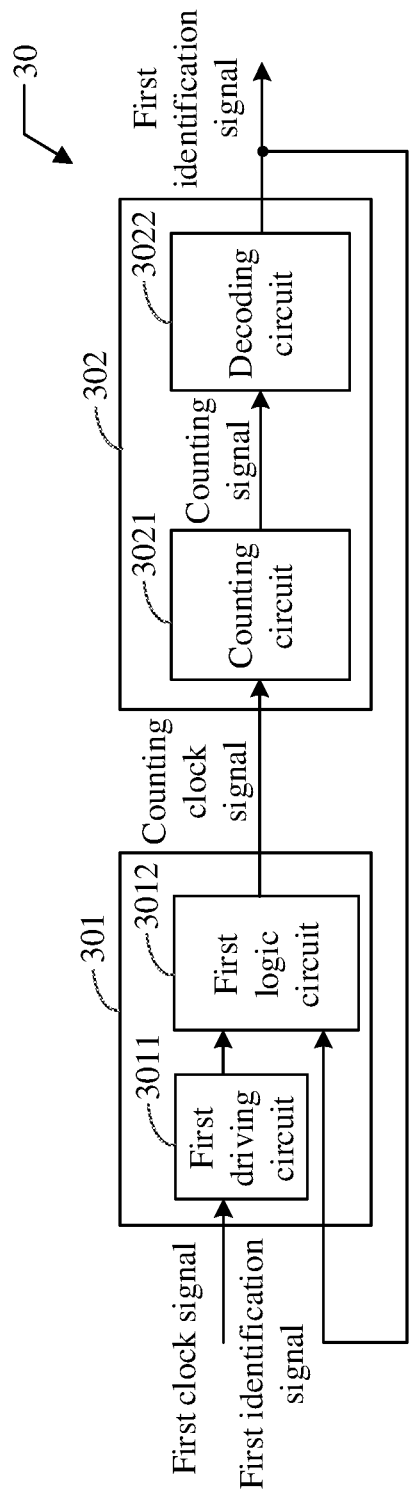
FIG. 6 is a fourth schematic diagram of a compositional structure of a counting control circuit according to an embodiment of the disclosure.

In some embodiments, with regard to the counting statistic circuit 302, based on the counting control circuit 30 shown in FIG. 4, with reference to FIG. 6, the counting statistic circuit 302 may include a counting circuit 3021 and a decoding circuit 3022, an output terminal of the counting circuit 3021 is connected to an input terminal of the decoding circuit 3022.

The counting circuit 3021 is configured to receive the counting clock signal, count according to the counting clock signal, and generate a counting signal used for characterizing the counting value.

The decoding circuit 3022 is configured to receive the counting signal, decode the counting signal, and generate the first identification signal, here, the first identification signal is in the valid state under a condition that the counting value meets the preset condition.

It should be noted that in FIG. 6, the counting signal may be represented by a (N+1)-bit binary data Code<N:0>. The counting signal is not only one signal, instead, it represents a set of signals. Here, the counting signal may include N+1 bits, and each bit corresponds to a signal respectively, specifically, may be Code<0>, Code<1>, Code<2>, . . . , Code<N>. A value of N is related to the counting value of the preset condition. Exemplarily, it is assumed that the counting value of the preset condition is 146 and a corresponding binary number is 10001010, then at least a 8-bit binary counting signal is required to count the counting clock signal; it is assumed that the counting value of the preset condition is 60 and a corresponding binary number is 111100, then at least a 6-bit binary counting signal is required to count the counting clock signal.

It should also be noted that the counting circuit 3021 may be composed of multiple flip-flops cascaded sequentially, and a number of the flip-flops is equal to a number of bits (N+1) of the counting signal. Exemplarily, it is assumed that the counting signal is an 8-bit binary signal, the number of flip-flops in the counting circuit 3021 is 8. A 16 Gb memory configuration is taken as an example, in order to meet that a complete ECS of the DRAM is completed within 24 hours, a time interval between ECS operations is 644 s, and a period of the counting clock signal is 4.4 s, then one count is completed when performing counting about 644/4.4=146 times. That is, a counting signal Code<7:0> for characterizing the counting value may be obtained by counting according to the counting clock signal; then, a decoding output result (i.e., the first identification signal) may be obtained by decoding the counting signal Code<7:0>. Only when the counting signal Code<7:0> meets 10010010, that is, the counting value reaches 146 (here, $2^1+2^4+2^7=146$), the first identification signal in the valid state may be generated by decoding at this point. That is, the counting signal may include multiple bits, and correspondences are present between the number of bits and the number of flip-flops; multiple bits may characterize the counting value, and the number of flip-flops may determine an upper limit value of the counting value. Exemplarily, when the number of flip-flops is 8 here, the counting signal may include 8 bits, such as Code<7:0>; at this point, a counting value range corresponding to the counting signal Code<7:0> is 00000000~11111111.

Furthermore, with regard to the counting circuit 3021, in a possible embodiment, the counting circuit 3021 may include an asynchronous binary counter.

The asynchronous binary counter includes multiple flip-flops cascaded sequentially, an input terminal (D) of the flip-flop at each stage is connected to a second output terminal (NOT-Q) of the flip-flop itself, the second output (NOT-Q) of the flip-flop at each stage is connected to a clock terminal (CK) of the flip-flop at a next stage, and a clock terminal (CK) of the flip-flop at the first stage is configured to receive the counting clock signal.

Figure 7:
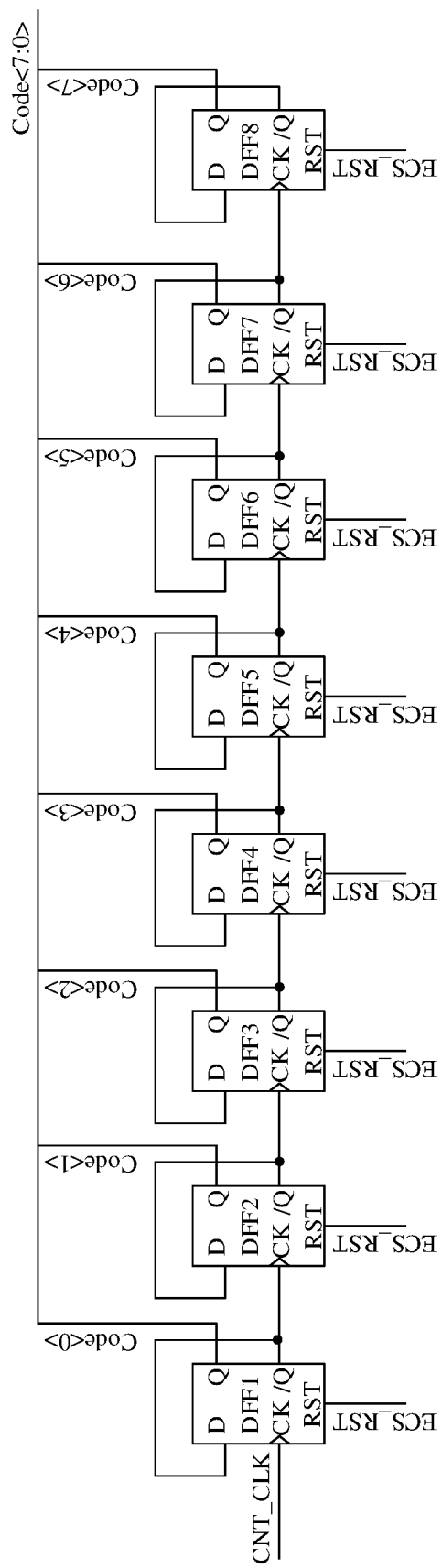
FIG. 7 is a schematic diagram of a compositional structure of an asynchronous binary counter according to an embodiment of the disclosure.

In the embodiment of the disclosure, an asynchronous binary counter shown in FIG. 7 is taken as an example, the counting circuit 3021 includes eight flip-flops. Here, the flip-flop may be a D-type flip-flop (Data Flip-Flop or Delay Flip-Flop, abbreviated as DFF). The D-type flip-flop is an information storage device with a memory function and having two stable states, and is the most basic logic unit constituting various timing circuits, and is also an important unit circuit in a digital logic circuit. The D-type flip-flop has two stable states, i.e., "0" and "1", and may be flipped from one stable state to another under action of the signal received by the clock terminal of the flip-flop.

In the embodiment of the disclosure, the flip-flop may include an input terminal (D), a clock terminal (CK), a first output terminal (Q) and a second output terminal (NOT-Q, represented by /Q), or may even include a reset terminal (RST). Here, the first output terminal (Q) of the flip-flop at each stage is configured to output corresponding bits in the counting signal sequentially. As shown in FIG. 7, first output terminals (Q) from the first stage to the last stage sequentially correspond to Code<0>, Code<1>, Code<2>, . . . , Code<7>; the reset terminal (RST) of the flip-flop at each stage is configured to receive the counting reset signal (represented by ECS_RST), which may achieve reset operation of the counting circuit 3021, and then restart the counting.

Furthermore, with regard to the counting circuit 3021, in another possible embodiment, the counting circuit 3021 may include a synchronous binary counter which may include multiple counting sub-circuits cascaded sequentially, each counting sub-circuit includes a flip-flop, and a clock terminal of each flip-flop is configured to receive the counting clock signal.

Multiple counting sub-circuits are configured to receive the counting clock signal, perform clock sampling through respective flip-flops contained therein, and output the counting signal. The counting signal includes multiple bits, and correspondences are present between multiple counting sub-circuits and multiple bits contained in the counting signal.

Simply speaking, in the embodiment of the disclosure, the synchronous binary counter may include multiple flip-flops cascaded sequentially, and the clock terminal of each of multiple flip-flops is configured to receive the counting clock signal.

Furthermore, in some embodiments, the synchronous binary counter may include a first counting sub-circuit, a second counting sub-circuit and an i-th counting sub-circuit, among multiple counting sub-circuits.

The first counting sub-circuit may include a first flip-flop, an input terminal (D) of the first flip-flop is connected to a second output terminal (/Q) of the first flip-flop, a clock terminal (CK) of the first flip-flop is configured to receive the counting clock signal, and a first output terminal (Q) of the first flip-flop is configured to output a first count signal, and the first counting signal is a zero-th bit in the counting signal.

The second counting sub-circuit may include a second flip-flop and a second XOR gate, a first input terminal of the second XOR gate is connected to the first output terminal (Q) of the first flip-flop, a second input terminal of the second XOR gate is connected to a first output terminal (Q) of the second flip-flop, an output terminal of the second XOR gate is connected to an input terminal (D) of the second flip-flop, a clock terminal (CK) of the second flip-flop is configured to receive the counting clock signal, and the first output terminal (Q) of the second flip-flop is configured to output a second counting signal which is a first bit in the counting signal.

The i-th counting sub-circuit may include an i-th flip-flop, an i-th NAND gate, an i-th NOT gate and an i-th XOR gate, a first input terminal of the i-th NAND gate is connected to a first output terminal (Q) of a (i−1)-th flip-flop, a second input terminal of the i-th NAND gate is connected to a first input terminal of a (i−1)-th XOR gate, an output terminal of the i-th NAND gate is connected to an input terminal of the i-th NOT gate, an output terminal of the i-th NOT gate is connected to a first input terminal of the i-th XOR gate, a second input terminal of the i-th XOR gate is connected to a first output terminal (Q) of the i-th flip-flop, an output terminal of the i-th XOR gate is connected to an input terminal (D) of the i-th flip-flop, a clock terminal (CK) of the i-th flip-flop is configured to receive the counting clock signal, and the first output terminal (Q) of the i-th flip-flop is configured to output an i-th counting signal which is a (i−1)-th bit in the counting signal, here, i is an integer greater than or equal to 3 and less than or equal to M, and M is a positive integer.

Figure 8:
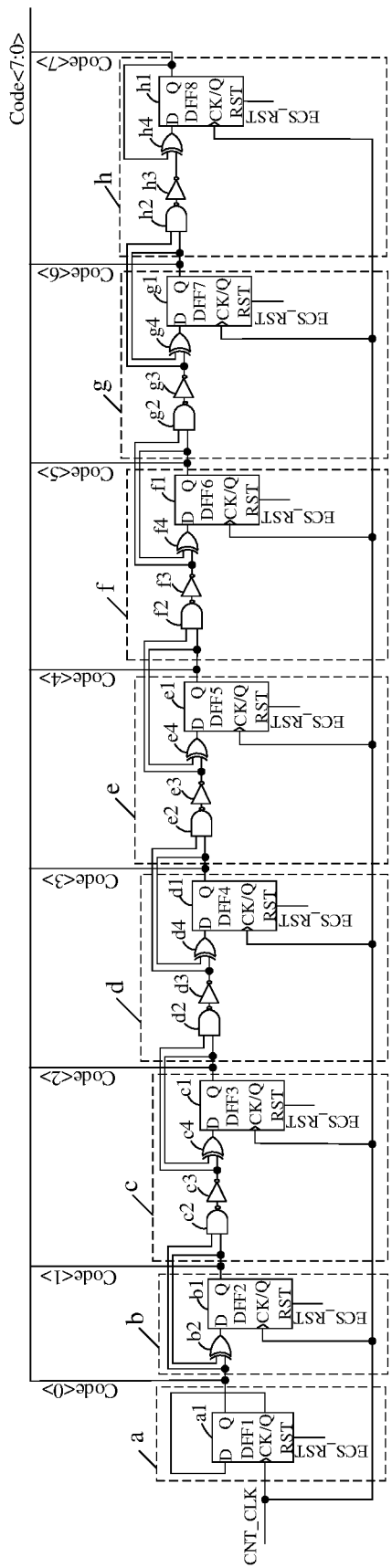
FIG. 8 is a schematic diagram of a compositional structure of a synchronous binary counter according to an embodiment of the disclosure.

In the embodiments of the disclosure, a synchronous binary counter shown in FIG. 8 is taken as an example, the counting circuit 3021 may include eight counting sub-circuits cascaded sequentially, and each counting sub-circuit includes at least one flip-flop. Specifically, the eight counting sub-circuits are a first counting sub-circuit a, a second counting sub-circuit b, a third counting sub-circuit c, a fourth counting sub-circuit d, a fifth counting sub-circuit e, a sixth counting sub-circuit f, a seventh counting sub-circuit g, and an eighth counting sub-circuit h. Specifically, the first counting sub-circuit a may include a first flip-flop a1, and a first counting signal outputted by the first counting sub-circuit a is represented by Code<0> which corresponds to a zero-th bit of the counting signal; the second counting sub-circuit b may include a second flip-flop b1 and a second XOR gate b2, and a second counting signal outputted by the second counting sub-circuit b is represented by Code<1> which corresponds to a first bit of the counting signal; the third counting sub-circuit c may include a third flip-flop c1, a third NAND gate c2, a third NOT gate c3 and a third XOR gate c4, and a third counting signal output by the third counting sub-circuit c is represented by Code<2> which corresponds to a second bit of the counting signal; the fourth counting sub-circuit d may include a fourth flip-flop d1, a fourth NAND gate d2, a fourth NOT gate d3 and a fourth XOR gate d4, and a fourth counting signal outputted by the fourth counting sub-circuit d is represented by Code<3> which corresponds to a third bit of the counting signal; the rest may be deduced by analogy, with regard to the eighth counting sub-circuit h, the eighth counting sub-circuit h may include an eighth flip-flop h1, an eighth NAND gate h2, an eighth NOT gate h3 and an eighth XOR gate h4, and an eighth counting signal outputted by the eighth counting sub-circuit h is represented by Code<7> which corresponds to a seventh bit of the counting signal. In this way, each of the eight counting sub-circuits receives the counting clock signal, performs clock sampling through a respective flip-flop contained therein, and outputs the counting signal including eight bits, and correspondences are present between the eight counting sub-circuits and eight bits contained in the counting signal. Exemplarily, the first counting sub-circuit is configured to output the zero-th bit Code<0> of the counting signal, the second counting sub-circuit is configured to output the first bit Code<1> of the counting signal, the third counting sub-circuit is configured to output the second bit Code<2> of the counting signal, ..., and the eighth counting sub-circuit is configured to output the seventh bit Code<7> of the counting signal.

Furthermore, in the synchronous binary counter shown in FIG. 8, a reset terminal (RST) of the flip-flop at each stage of the eight counting sub-circuits is configured to receive the counting reset signal (represented by ECS_RST), which may also achieve reset operation (clearing operation) of the counting circuit 3021, and then restart the counting.

In summary, the counting circuit 3021 may be an asynchronous binary counter or a synchronous binary counter. Circuit implementation of the former is simple; however, usage of the asynchronous binary counter may result in delay of output at each stage of the counter, especially when there is a high refresh frequency and there is a large number of stages of the counter, the delay problem is more serious. If the first stage is changed again before the last stage is changed due to the delay problem of the counter, it may result in a situation where erroneous decoding of the counter occurs, which may affect accuracy of a decoding output result, and then make subsequent functions completed according to the decoding output result unable to be performed normally. Furthermore, circuit implementation of the latter is relatively complex, however, output of each stage may be aligned by using the synchronous binary counter, which ensures that an erroneous decoding process is not present in the output of the counter, thereby reducing influence of the delay of the counter on the first identification signal. Here, in order to ensure that the erroneous decoding process is not present in the output of the counter and avoid affecting a next counting, the embodiments of the disclosure may use the synchronous binary counter so that the output of each stage is aligned, thereby improving influence of the delay of the counter on the first identification signal.

Figure 9:
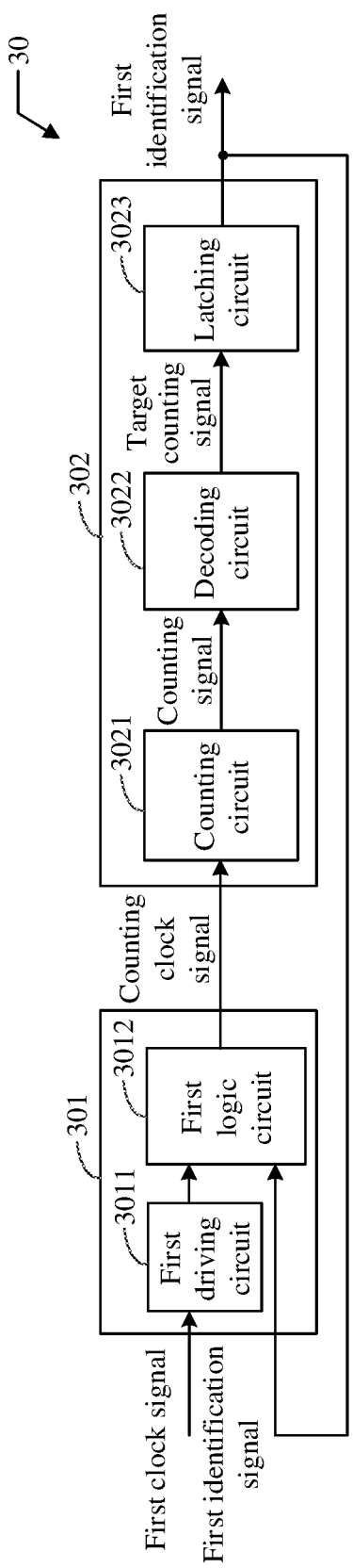
FIG. 9 is a fifth schematic diagram of a compositional structures of a counting control circuit according to an embodiment of the disclosure.

Furthermore, in some embodiments, with regard to the counting statistic circuit 302, based on the counting control circuit 30 shown in FIG. 6, with reference to FIG. 9, the counting statistic circuit 302 may further include a latching circuit 3023 connected to an output terminal of the decoding circuit 3022.

The counting circuit 3021 is configured to receive the counting clock signal, count according to the counting clock signal, and generate a counting signal used for characterizing the counting value.

The decoding circuit 3022 is configured to receive the counting signal, decode the counting signal, and generate a target counting signal.

The latching circuit 3023 is configured to receive the target counting signal, latch the target counting signal under a condition that the target counting signal is in a valid state, and generate a first identification signal in a valid state.

It should be noted that in the embodiments of the disclosure, when the counting value meets the preset condition (that is, the counting value reaches a preset value), the target counting signal may be in the valid state. Furthermore, in FIG. 9, the counting signal may be represented by Code<N: 0>, and the target counting signal may be represented by ECS_CNT. A level value of the ECS_CNT signal may also include a first value and a second value. Exemplarily, in case that the first value is Logic 1 indicating a high level and the second value is Logic 0 indicating a low level: if the level value of the ECS_CNT signal is Logic 1, it is determined that the ECS_CNT signal is in the valid state; otherwise, when the level value of the ECS_CNT signal is Logic 0, it is determined that the ECS_CNT signal is in an invalid state.

It should also be noted that in the embodiments of the disclosure, the latching circuit 3023 is introduced here. The target counting signal may be generated when counting is completed, the first identification signal may be generated after the target counting signal passes through the latching circuit 3023, and the command signal for performing the ECS operation may be generated when the first identification signal is in the valid state, to ensure that all ECSs are completed within 24 hours.

Figure 10:
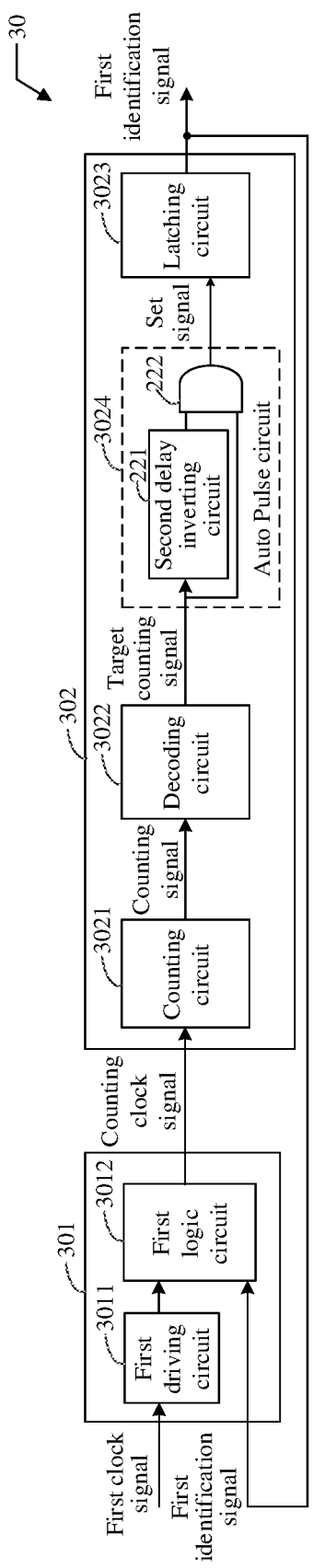
FIG. 10 is a sixth schematic diagram of a compositional structures of a counting control circuit according to an embodiment of the disclosure.

Furthermore, in some embodiments, with regard to the counting statistic circuit 302, based on the counting control circuit 30 shown in FIG. 6, with reference to FIG. 10, the counting statistic circuit 302 may further include a latching circuit 3023 and an Auto Pulse circuit 3024, an input terminal of the Auto Pulse circuit 3024 is connected to the output terminal of the decoding circuit 3022, and an output terminal of the Auto Pulse circuit 3024 is connected to a set terminal (SET) of the latching circuit 3023.

The counting circuit 3021 is configured to receive the counting clock signal, count according to the counting clock signal, and generate a counting signal used for characterizing the counting value.

The decoding circuit 3022 is configured to receive the counting signal, decode the counting signal, and generate a target counting signal.

The Auto Pulse circuit 3024 is configured to generate a set signal according to the target counting signal, and the set signal is in a valid state when the target counting signal is in a valid state.

The latching circuit 3023 is configured to receive the set signal, and generate a first identification signal in a valid state according to the set signal under a condition that the set signal is in the valid state.

It should be noted that the latching circuit described in the embodiments of the disclosure may be an SR latch, and the SR latch may be composed of two two-input NAND gates. Furthermore, in the embodiments of the disclosure, the SR latch includes a set terminal, a reset terminal and an output terminal. The set terminal of the SR latch is configured to receive the set signal, the reset terminal of the SR latch is configured to receive the reset signal, and the output terminal of the SR latch is configured to output the first identification signal.

It should also be noted that in the embodiments of the disclosure, the set signal may be in the valid state when the target counting signal is in the valid state; the set signal may be in an invalid state when the target counting signal is in an invalid state. The first identification signal in the valid state may be generated only when the set signal is in the valid state.

It should also be noted that in the embodiments of the disclosure, the set signal may be represented by SET. A level value of the SET signal may also include a first value and a second value. Exemplarily, in case that the first value is Logic 1 indicating a high level and the second value is Logic 0 indicating a low level: if the level value of the SET signal is Logic 1, it is determined that the SET signal is in the valid state; otherwise, if the level value of the SET signal is Logic 0, it is determined that the SET signal is in the invalid state.

Furthermore, in some embodiments, with regard to the Auto Pulse circuit 3024, as shown in FIG. 10, the Auto Pulse circuit 3024 may include a second delay inverting circuit 221 and a first AND gate 222.

The second delay inverting circuit 221 is configured to delay and invert the target counting signal, to obtain a target counting inverted signal.

The first AND gate 222 is configured to perform an AND logical operation on the target counting inverted signal and the target counting signal, to obtain the set signal.

It should be noted that in the embodiments of the disclosure, an input terminal of the second delay inverting circuit 221 is configured to receive the target counting signal, a first input terminal of the first AND gate 222 is connected to the output terminal of the decoding circuit 3022, a second input terminal of the first AND gate 222 is connected to an output terminal of the second delay inverting circuit 221, and an output terminal of the first AND gate 222 (used as the output terminal of the Auto Pulse circuit 3024) is connected to the set terminal (SET) of the latching circuit 3023.

It should also be noted that in the embodiments of the disclosure, the target counting inverted signal may be generated by a signal generator, and a delay and inverted relationship is present between the generated target counting inverted signal and the target counting signal; or, the target counting inverted signal may be obtained by performing a delay and invert process on the target counting signal by the second delay inverting circuit, and then the AND logical operation is performed on the target counting inverted signal and the target counting signal to obtain a SET signal.

That is, in the embodiments of the disclosure, with regard to the Auto Pulse circuit, the Auto Pulse is a small pulse signal formed by performing the AND logical operation on the target counting signal and the target counting inverted signal obtained by delaying and inverting the target counting signal, to be used as the SET signal of the latching circuit 3023; the SET may be used to generate the first identification signal. Furthermore, it should be noted that the target counting signal need to meet a certain conditions (specifically, changing from the invalid state to the valid state, for example, changing from a low level state to a high level state), so that the Auto Pulse may form a small pulse signal at this point, and pulse width is equal to a delay time of the second delay inverting circuit.

Specifically, in the embodiments of the disclosure, the set signal is a pulse signal which is valid at a high level. The greater the delay time of the delay inverting circuit to the target counting signal, the wider the pulse width of the set signal; the smaller the delay time of the delay inverting circuit to the target counting signal, the narrower the pulse width of the set signal. It may be seen that correspondences are present between the pulse width of the set signal and the delay time of the delay inverting circuit to the target counting signal.

It should also be noted that in the embodiments of the disclosure, the delay inverting circuit may be composed of a delay circuit and an inverting circuit connected in series, and the inverting circuit may be an inverter, a NOT gate, or the like, so that delay and inverting may be implemented on the target counting signal.

It should also be noted that in the embodiments of the disclosure, besides the Auto Pulse circuit 3024 may be composed of a delay inverting circuit and an AND gate, the Auto Pulse circuit 3024 may be composed of a delay inverting circuit and a NOR gate, an input terminal of the delay inverting circuit is configured to receive the target counting signal, an output terminal of the delay inverting circuit is connected to a first input terminal of the NOR gate, a second input terminal of the NOR gate is configured to receive the target counting signal, and an output terminal of the NOR gate is configured to output the set signal. Or, the Auto Pulse circuit 3024 may be composed of a delay inverting circuit, an OR gate and a NOT gate, an input terminal of the delay inverting circuit is configured to receive the target counting signal, an output terminal of the delay inverting circuit is connected to a first input terminal of the OR gate, a second input terminal of the OR gate is configured to receive the target counting signal, an output terminal of the OR gate is connected to an input terminal of the NOT gate, an output terminal of the NOT gate is configured to output the set signal. The Auto Pulse circuit 3024 may even be a combination of other logic devices, as long as it may generate a small pulse signal, and internal structures thereof are not limited in any way.

Figure 11:
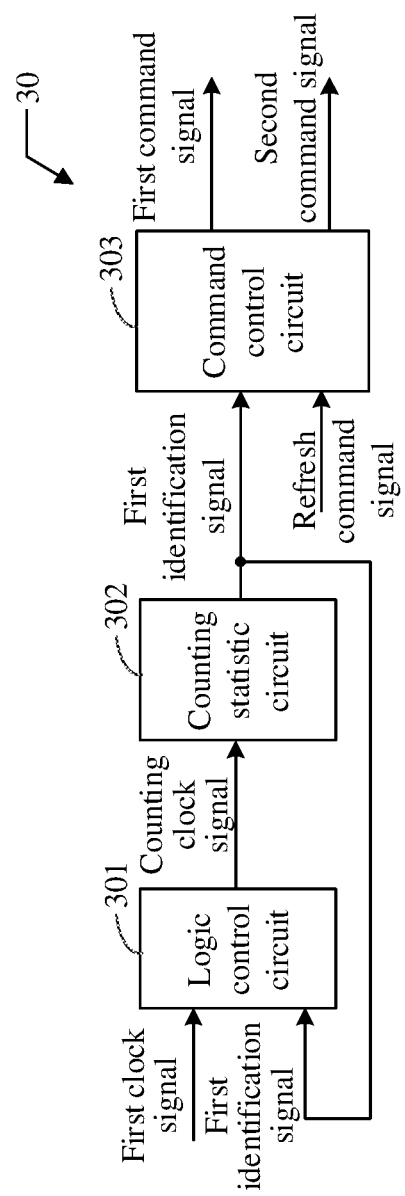
FIG. 11 is a seventh schematic diagram of a compositional structure of a counting control circuit according to an embodiment of the disclosure.

It may also be understood that in some embodiments, based on the counting control circuit 30 shown in FIG. 3, with reference to FIG. 11, the counting control circuit 30 may further include a command control circuit 303.

The command control circuit 303 is configured to receive the first identification signal and a refresh command signal, and generate a first command signal according to the refresh command signal under a condition that the first identification signal is in the valid state, or generate a second command signal according to the refresh command signal under a condition that the first identification signal is in an invalid state.

It should be noted that after receiving the first identification signal: under a condition that the first identification signal is in the valid state, the command control circuit 303 may acquire the refresh command signal and generate the first command signal according to the refresh command signal; under a condition that the first identification signal is in the invalid state, the command control circuit 303 may directly output the refresh command signal as the second command signal at this point.

It should also be noted that in the embodiments of the disclosure, the first command signal is different from the second command signal. The first command signal is an ECS command signal for performing an ECS operation, and the second command signal is an internal refresh signal for performing a refresh operation. Here, the ECS command signal may be represented by ECS_CMD, and the internal refresh signal may be represented by REF_NEW.

It should also be noted that in the embodiments of the disclosure, a level value of the first identification signal may include a first value and a second value. The first value may be Logic 1 indicating a high level, and the second value may be Logic 0 indicating a low level; or, the first value may be Logic 0 indicating a low level, and the second value may be Logic 1 indicating a high level, which are not limited in any way.

Exemplarily, if the level value of the first identification signal is Logic 1, it may be determined that the first identification signal is in the valid state, the ECS_CMD signal is generated according to the acquired refresh command signal at this point; otherwise, if the level value of the first identification signal is Logic 0, it may be determined that the first identification signal is in the invalid state, the REF_NEW signal may be output according to the acquired refresh command signal at this point.

Simply speaking, DDR5 DRAM is taken as an example, since the DRAM requires a complete ECS to be performed at least within 24 hours, the counting statistic circuit 302 need to plan a time interval between ECS operations in the automatic ECS operation mode. Specifically, when the counting value meets the preset conditions, a valid first identification signal may be generated, which may be represented by ECS_Flag; the ECS_Flag signal is transmitted to the command control circuit 303; in this circuit, when the ECS_Flag signal is in a valid state, a next refresh command may be stolen to generate an ECS_CMD signal to perform the ECS operation, and correspondingly, the stolen refresh command may disappear simultaneously; when the ECS_Flag signal is in an invalid state, the refresh command may not be stolen and is directly transmitted as a REF_NEW signal to perform a normal refresh operation.

Figure 12:
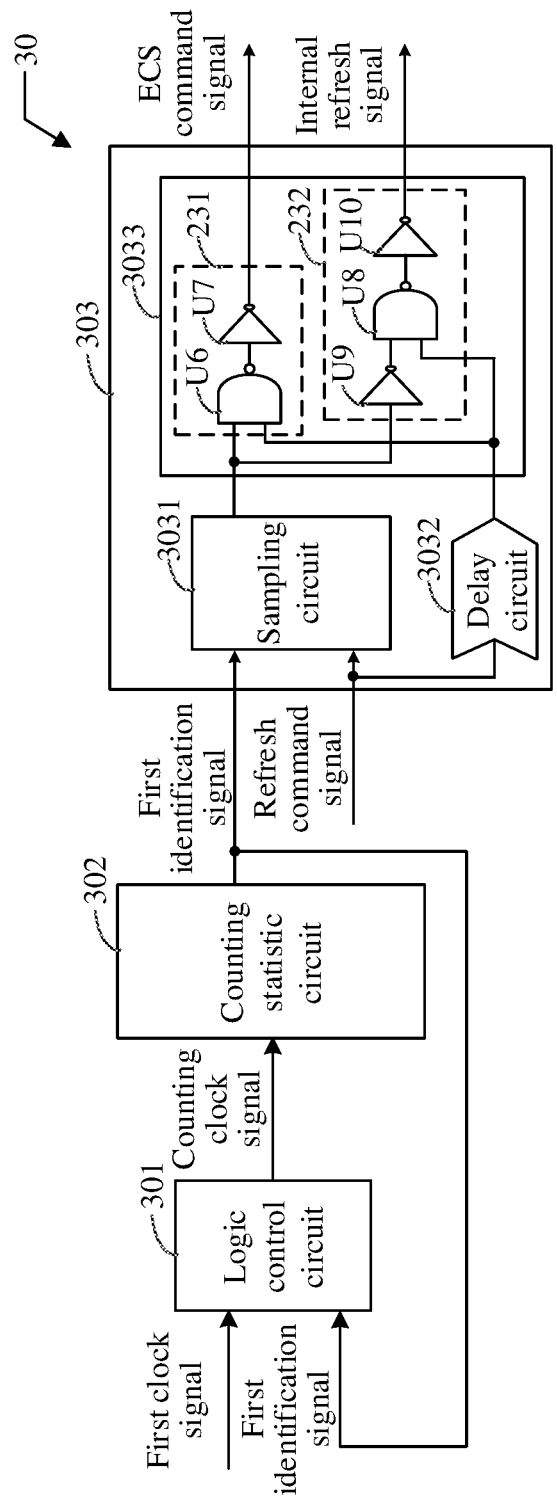
FIG. 12 is an eighth schematic diagram of a compositional structure of a counting control circuit according to an embodiment of the disclosure.

Furthermore, in some embodiments, with regard to the command control circuit 303, with reference to FIG. 12, the command control circuit 303 may include a sampling circuit 3031, a delay circuit 3032 and a logic processing circuit 3033.

The sampling circuit 3031 is configured to receive the refresh command signal and an ECS identification signal, and sample the first identification signal according to the refresh command signal, to obtain a sampling signal.

The delay circuit 3032 is configured to delay the refresh command signal, to obtain a delayed refresh signal.

The logic processing circuit 3033 is configured to perform a logical operation on the sampling signal and the delayed refresh signal, and selectively output the ECS command signal for performing the ECS operation when the sampling signal is in a valid state; and selectively output the internal refresh signal for performing the refresh operation when the sampling signal is in an invalid state.

It should be noted that in the embodiments of the disclosure, the sampling signal is in the valid state when the first identification signal is in the valid state, and the sampling signal is in the invalid state when the first identification signal is in the invalid state. A level value of the sampling signal may also include a first value and a second value. Exemplarily, in case that the first value is Logic 1 indicating a high level and the second value is Logic 0 indicating a low level: if the level value of the sampling signal is Logic 1, it is determined that the sampling signal is in the valid state; otherwise, if the level value of the sampling signal is Logic 0, it is determined that the sampling signal is in the invalid state.

It should also be noted that in the embodiments of the disclosure, the sampling circuit 3031 may be a D-type flip-flop. Here, an input terminal (D) of the D-type flip-flop is configured to receive the ECS identification signal, a clock terminal (CK) of the D-type flip-flop is configured to receive the refresh command signal, and an output terminal (Q) of the D-type flip-flop is configured to output the sampling signal.

Furthermore, in some embodiments, as shown in FIG. 12, the logic processing circuit 3033 includes a second logic circuit 231 and a third logic circuit 232.

The second logic circuit 231 is configured to perform a first logical operation on the sampling signal and the delayed refresh signal when the sampling signal is in the valid state, and output the ECS command signal to perform the ECS operation.

The third logic circuit 232 is configured to perform a second logical operation on the sampling signal and the delayed refresh signal when the sampling signal is in the invalid state, and output the internal refresh signal to perform the refresh operation.

It should also be noted that in the embodiments of the disclosure, it may be determined, according to whether the sampling signal is in the valid state or not, whether the second logic circuit 231 is selected to output the ECS_CMD signal in the valid state, or the third logic circuit 232 is selected to output the REF_NEW signal in the valid state. Specifically, if the ECS_CMD signal is output, the refresh operation will not be performed again, and at this point, it may ensure by the ECS operation that all ECSs are completed within 24 hours; if the REF_NEW signal is output, the refresh operation is not affected, and the ECS operation will not be performed at this point.

In a possible embodiment, as shown in FIG. 12, the second logic circuit 231 includes a second NAND gate U6 and a fifth NOT gate U7, a first input terminal of the second NAND gate U6 is connected to an output terminal of the sampling circuit 3031, a second input terminal of the second NAND gate U6 is connected to an output terminal of the delay circuit 3032, and an output terminal of the second NAND gate U6 is connected to an input terminal of the fifth NOT gate U7.

The second NAND gate U6 is configured to: under a condition that the sampling signal is in the valid state, perform a NAND logical operation on the sampling signal and the delayed refresh signal to obtain a first intermediate signal.

The fifth NOT gate U7 is configured to perform a NOT logical operation on the first intermediate signal, to obtain the ECS command signal.

In the embodiment of the disclosure, the ECS_CMD signal may be generated by the second logic circuit 231 under a condition that the sampling signal is in the valid state. Specifically, the ECS_CMD signal may be generated by stealing a next refresh command REF_AB, and the stolen refresh command will disappear.

In a possible embodiment, as shown in FIG. 12, the third logic circuit 232 may include a third NAND gate U8, a sixth NOT gate U9 and a seventh NOT gate U10, an input terminal of the sixth NOT gate U9 is connected to the output terminal of the sampling circuit 3031, a first input terminal of the third NAND gate U8 is connected to an output terminal of the sixth NOT gate U9, a second input terminal of the third NAND gate U8 is connected to the output terminal of the delay circuit 3032, and an output terminal of the third NAND gate U8 is connected to an input terminal of the seventh NOT gate U10.

The sixth NOT gate U9 is configured to: under a condition that the sampling signal is in the invalid state, perform a NOT logical operation on the sampling signal to obtain a second intermediate signal.

The third NAND gate U8 is configured to perform a NAND logical operation on the second intermediate signal and the delayed refresh signal, to obtain a third intermediate signal.

The seventh NOT gate U10 is configured to perform a NOT logical operation on the third intermediate signal, to obtain the internal refresh signal.

In the embodiment of the disclosure, under a condition that the sampling signal is in the invalid state, the internal refresh signal may be obtained by the third logic circuit 232. Specifically, the refresh command REF_AB is directly output as the REF_NEW signal, the refresh command will not be stolen at this point, and the performed refresh operation is not affected either.

Furthermore, as shown in FIG. 12, in some embodiments, a delay time of the delay circuit is greater than a sum of delay time of the sampling circuit and delay time of the sixth NOT gate.

In the embodiments of the disclosure, FIG. 12 is taken as an example, the delay time of the delay circuit 3032 need to be greater than a sum of delay time of the sampling circuit 3031 and delay time of the sixth NOT gate U9. In other words, the delay circuit 3032 need to make the delayed refresh signal later than the second intermediate signal after the sampling signal is inverted. Under a condition that the ECS_Flag signal is in the valid state (i.e., Logic 1), output of the sampling circuit 3031 is also Logic 1, and output of the refresh command REF_AB may be blocked by the sixth NOT gate U9 (its output is Logic 0). However, delay is present in each of the sampling circuit 3031 and the sixth NOT gate U9, and if a time when the refresh command REF_AB reaches the third NAND gate U8 is earlier than output of the sixth NOT gate U9 (the output when the level value of the ECS_Flag signal is Logic 1), a function of blocking the refresh command REF_AB cannot be achieved at this point. Therefore, the refresh command REF_AB need to be delayed by the delay circuit 3032, so that the time when the refresh command REF_AB reaches the third NAND gate U8 is slightly later than output of the sixth NOT gate U9.

In some embodiments, the refresh command signal here may include at least one of a refresh signal or a self-refresh signal.

It should be noted that in the automatic ECS operation mode, DDR5 SPEC specifies that the automatic ECS operation needs to plan and generate the ECS_CMD signal in refresh and self-refresh, to detect erroneous information and perform detection and repair of internal read-write errors simultaneously. Counting a number of refresh and self-refresh is required when an automatic ECS operation command is generated by means of the refresh command signal, however, there is no external clock during self-refresh. Therefore, the first clock signal in the embodiments of the disclosure may be a signal with a natural frequency, to be used as a clock signal for counting, thereby not only solving a technical problem that the ECS command signal cannot be generated by means of self-refresh in the related art, but also solving a technical problem that the complete ECS operation cannot be completed within 24 hours when refresh commands in other forms are transmitted.

Figure 13:
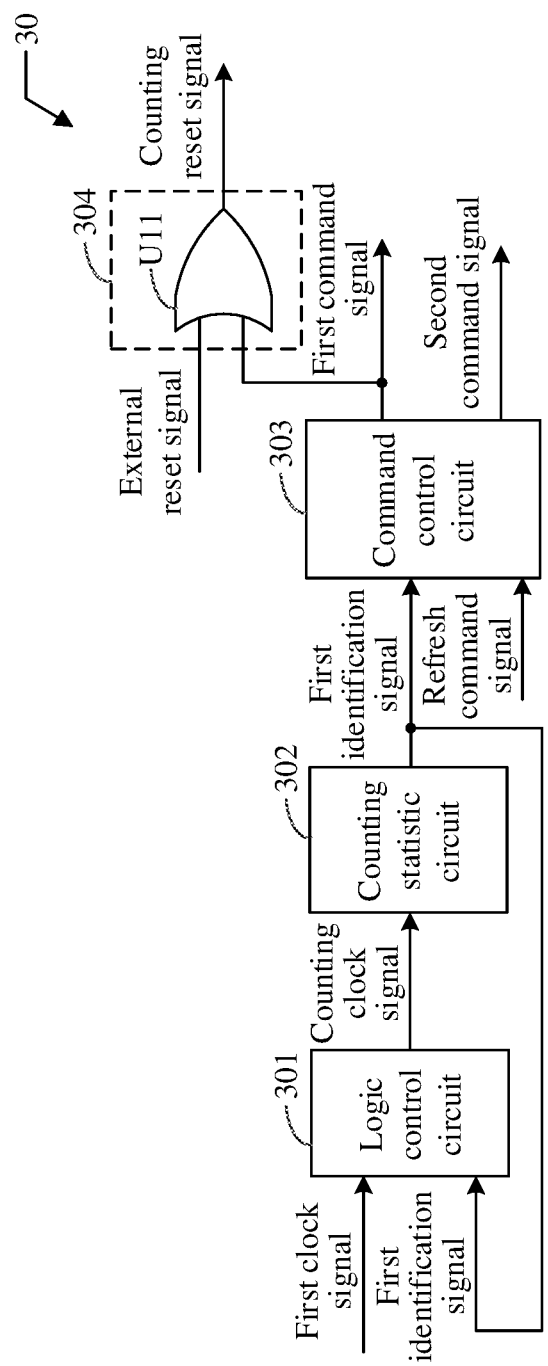
FIG. 13 is a ninth schematic diagram of a compositional structure of a counting control circuit according to an embodiment of the disclosure.

It may also be understood that in some embodiments, with regard to the foregoing counting reset signal, based on the counting control circuit 30 shown in FIG. 11, with reference to FIG. 13, the counting control circuit 30 may further include a reset logic circuit 304.

The reset logic circuit 304 is configured to receive a first command signal and an external reset signal, perform a logical operation on the first command signal and the external reset signal, and generate the counting reset signal to be transmitted to the counting statistic circuit 302.

It should be noted that in the embodiments of the disclosure, the first identification signal may indicate a generation of the first command signal under a condition that the first identification signal is in the valid state. Furthermore, after obtaining the counting reset signal, the reset logic circuit 304 may transmit the counting reset signal to the counting statistic circuit 302, in particular to a reset terminal of the flip-flop at each stage of the counting circuit 3021 inside the counting statistic circuit 302, to achieve resetting operation (i.e., clearing operation) of the counting circuit 3021.

In a specific embodiment, with reference to FIG. 13, the reset logic circuit 304 may include a first OR gate U11. The first input terminal of the first OR gate U11 is configured to receive the external reset signal, a second input terminal of the first OR gate U11 is configured to receive the first command signal, and an output terminal of the first OR gate U11 is configured to output the counting reset signal.

It should be noted that in the embodiments of the disclosure, the counting control circuit 30 requires the external reset signal to perform a reset operation when the counting control circuit 30 starts operation. The external reset signal may be a low level signal of Logic 0 continuously after a first reset. Furthermore, in the embodiments of the disclosure, according to the logical operation on the external reset signal and the first command signal, a level value of the generated counting reset signal may include a first value and a second value. Exemplarily, the first value is Logic 1 indicating a high level, and the second value is Logic 0 indicating a low level. If the level value of the counting reset signal is Logic 1, it is determined that the counting reset signal is in a valid state; otherwise, if the level value of the counting reset signal is Logic 0, it is determined that the counting reset signal is in an invalid state.

It should also be noted that in the embodiments of the disclosure, the counting reset signal is transmitted to the counting statistic circuit 302, so that the counting statistic circuit 302 restarts counting and controls the ECS_Flag signal to be in the invalid state. Specifically, after the ECS_Flag signal in the valid state is generated by the counting statistic circuit 302, on one hand, a logical operation is performed on the ECS_Flag signal and the ECS_CLK signal, to obtain the CNT_CLK signal for counting, and when the ECS_Flag signal is in the valid state, the counting statistic circuit 302 may stop working to reduce power consumption; on the other hand, after the first command signal is generated, a logical operation is performed on the first command signal and the external reset signal, to generate the counting reset signal for the counting statistic circuit 302, so that the counting statistic circuit is reset; furthermore, after the first command signal is generated, the ECS_Flag signal will be in the invalid state, the counting clock signal may be generated by the logic control circuit 301 at this point, so that the counting statistic circuit starts counting. Here, the reset operation of the counter needs to be completed before the time when the counting clock signal is generated, to ensure that counting is started after reset is completed, and a technical problem that counting and reset operations are performed simultaneously and thus induce conflict may not occur.

Furthermore, it should also be noted that with regard to the invalid state of the ECS_Flag signal, the ECS_Flag signal may be directly controlled to be in the invalid state according to the first command signal ECS_CMD; or, the counting reset signal may be generated according to the first command signal ECS_CMD, to reset the counter, and then the ECS_Flag signal may be in the invalid state according to a reset counting value.

Figure 14:
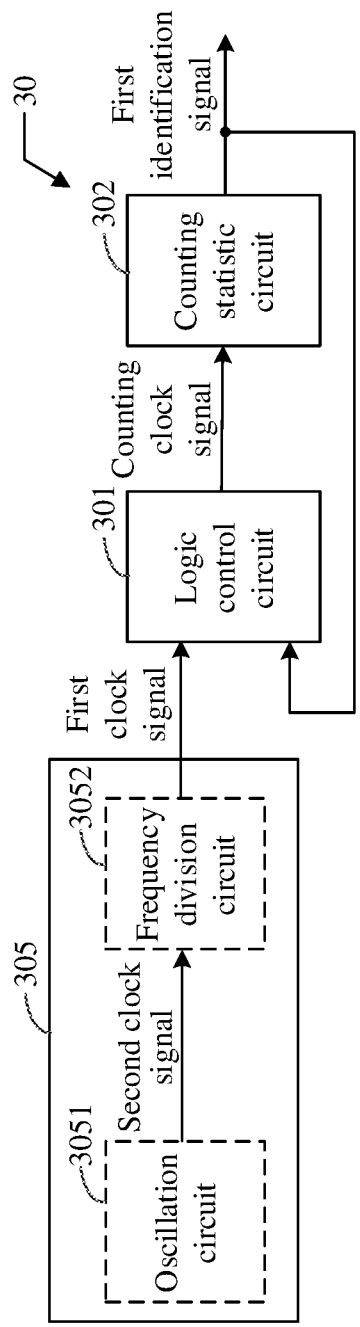
FIG. 14 is a tenth schematic diagram of a compositional structure of a counting control circuit according to an embodiment of the disclosure.

It may also be understood that in some embodiments, with regard to the foregoing first clock signal, based on the counting control circuit 30 shown in FIG. 3, with reference to FIG. 14, the counting control circuit 30 may further include a clock generation circuit 305.

The clock generation circuit 305 is configured to generate the first clock signal.

In a specific embodiment, with reference to FIG. 14, the clock generation circuit 305 may include an oscillation circuit 3051 and a frequency division circuit 3052.

The oscillation circuit 3051 is configured to output a second clock signal with a preset frequency.

The frequency division circuit 3052 is configured to perform n-frequency division on the second clock signal, to obtain the first clock signal.

Frequency of the first clock signal is one n-ths of the preset frequency, n is an integer greater than zero.

It should be noted that in the embodiments of the disclosure, the frequency of the first clock signal is one n-th of the preset frequency, n is an integer greater than zero.

It should also be noted that in the embodiments of the disclosure, the oscillation circuit 3051 may be an oscillator (OSC), such as a ring OSC, a crystal OSC, or the like. Here, the oscillation circuit 3051 is a ring OSC for generating the second clock signal with a fixed frequency; then, frequency division on the second clock signal is performed by the frequency division circuit 3052, to obtain the first clock signal for counting. The second clock signal may be represented by OSC_CLK, and the first clock signal may be represented by ECS_CLK.

Exemplarily, the ring OSC may be used to generate the OSC_CLK signal with a fixed frequency. It is assumed a clock frequency of 1818 kHz and a corresponding clock period of 550 ns, then the ECS_CLK signal with a clock frequency of 227 kHz is output after frequency division, and a corresponding clock period is 4.4 s. Therefore, since the counting control circuit 30 includes the clock generation circuit 305, the first clock signal required for counting may be generated, thereby not only solving a technical problem that there is no external clock during self-refresh, but also solving a problem that the count does not increase when the controller transmits refresh commands in other forms which causes a problem that the complete ECS operation cannot be completed within 24 hours.

It should also be noted that in the embodiments of the disclosure, design of internal circuits of the decoding circuit in the counting statistic circuit may be achieved according to instruction decoding rules. The decoding rules may be different for different products, different application scenarios and different instructions, then specific structures of the decoding circuit may be adjusted correspondingly, which are not specifically limited in the embodiments of the disclosure.

The embodiments of the disclosure provide a counting control circuit, and the counting control circuit includes a logic control circuit and a counting statistic circuit. After receiving the first clock signal, the logic control circuit performs a logical operation in combination with the first identification signal, to obtain the counting clock signal for counting, and the first identification signal may be generated according to the counting clock signal, to generate the first command signal for performing the ECS operation. At this point, limitations of refresh commands are not considered for counting, which solves a technical problem that counting may be performed by means of REF_AB only to generate ECS command signals in the related art, and may ensure that the complete ECS operation is completed within 24 hours. Furthermore, a logical relationship is present between the counting clock signal and the first identification signal, and when the counting clock signal is used for counting, the counting statistic circuit is controlled to stop counting or not according to a state of the first identification signal, thereby achieving a purpose of reducing power consumption and finally improving performance of the memory.

Figure 15:
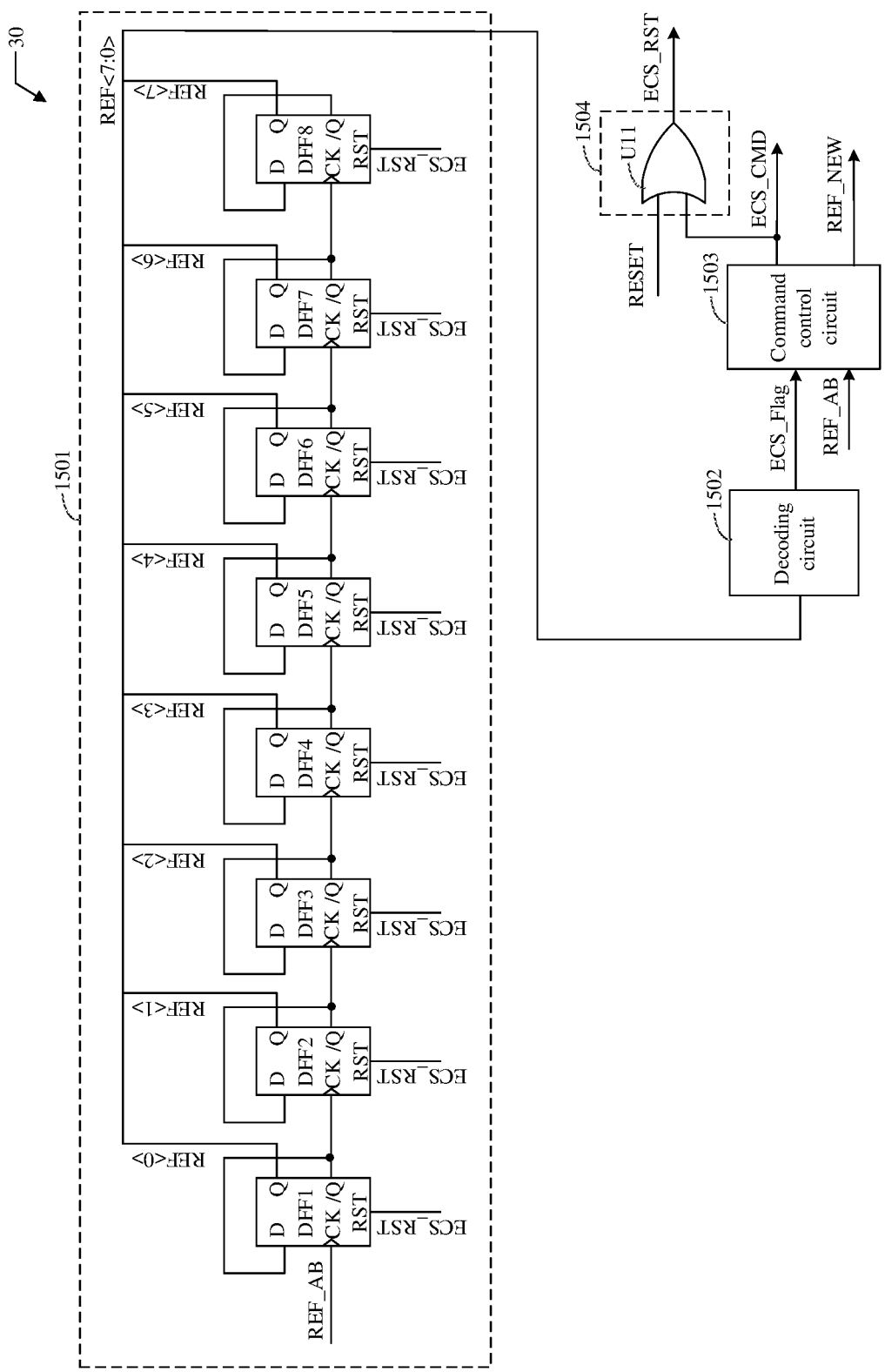
FIG. 15 is an eleventh schematic diagram of a compositional structure of a counting control circuit according to an embodiment of the disclosure.

In another embodiment of the disclosure, based on the counting control circuit 30 described in the foregoing embodiments, with reference to FIG. 15, a schematic diagram of a compositional structure of another counting control circuit 30 according to an embodiment of the disclosure is shown. As shown in FIG. 15, the counting control circuit 30 may include an asynchronous counter 1501, a decoding circuit 1502, a command control circuit 1503, and a reset logic circuit 1504 which includes a first OR gate U11. A counting clock signal of the asynchronous counter 1501 is a refresh command REF_AB, a counting signal output by the asynchronous counter 1501 is represented by REF<7:0>, and REF<7:0> signal is used for characterizing a counting value. When the counting value meets a preset condition, the REF<7:0> signal at this point may be decoded by the decoding circuit 1502 to obtain a first identification signal in a valid state (represented by ECS_Flag). The ECS_Flag signal is transmitted to the command control circuit 1503 where a refresh command REF_AB received at a next time may be acquired, and a first command signal may be generated according to the refresh command REF_AB. At this point, an external reset signal (represented by RESET) and a first command signal (represented by ECS_CMD) may also be input to the reset logic circuit 1504, and subjected to an OR logical operation performed by the first OR gate U11 within the reset logic circuit 1504, then a counting reset signal (represented by ECS_RST) may be output and transmitted to a reset terminal (RST) of the flip-flop at each stage of the asynchronous counter 1501, to reset the count of the asynchronous counter 1501. Furthermore, the ECS_Flag signal may be in an invalid state after the ECS_CMD signal is generated. At this point, in the command control circuit 1503, if the ECS_Flag signal is in the invalid state, the acquired refresh command REF_AB is directly output as the second command signal (i.e., the internal refresh signal, represented by REF_NEW).

Figure 16:
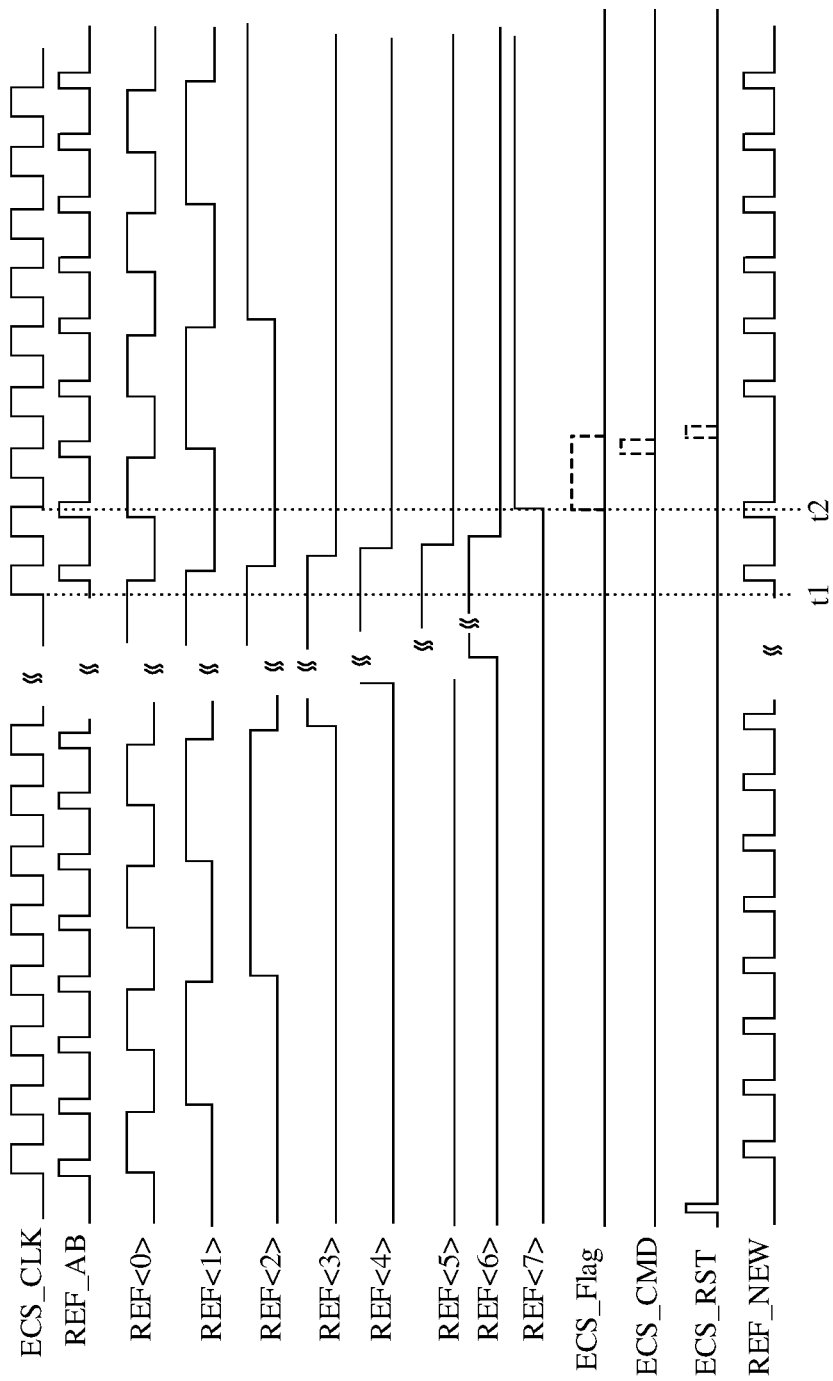
FIG. 16 is a schematic diagram of signal timing sequence of a counting control circuit according to an embodiment of the disclosure.

Based on the counting control circuit shown in FIG. 15, FIG. 16 shows a schematic diagram of signal timing sequence of a counting control circuit according to an embodiment of the disclosure. As shown in FIG. 16, REF<0>, REF<1>, REF<2>, REF<3>, REF<4>, REF<5>, REF<6>, REF<7> are eight bits included in the counting signal. Due to characteristics of the asynchronous counter itself, there may be delay and misalignment in counting output of the asynchronous counter. At this point, a counting error may occur when there is a too fast refresh frequency and there is a large number of stages of the counter. In FIG. 16, it is assumed that at time t1, a binary number corresponding to a 8-bit counting signal is 01111111; at a next time, a count under a normal condition is 10000000, however, REF<0> has changed again before REF<7> is changed due to the too fast refresh frequency, that is, at time t2, the binary number corresponding to the 8-bit counting signal is 10000001, that is, a counting error may occur to the asynchronous counter. Therefore, an erroneous decoding situation occurs to the decoding circuit 1502, thus a valid ECS_Flag signal cannot be generated, and an ECS_CMD signal cannot be generated according to the valid ECS_Flag signal, and further an ECS_RST signal cannot be generated by the reset logic circuit 1504, as shown by dotted lines in FIG. 16. In short, due to inaccuracy of the decoding result, subsequent functions completed according to the decoding result cannot be performed normally.

Furthermore, with regard to the counting control circuit shown in FIG. 15, on one hand, the refresh command REF_AB is used as the clock signal of the counter, and if the controller refreshes in other ways such as REFsb or the like, the counter does not increase, resulting in a problem that the complete ECS operation cannot be completed within 24 hours. On the other hand, usage of the asynchronous counter may result in delay of output at each stage of the counter, which may result in an erroneous decoding process of the count before the last stage is changed, thereby possibly affecting a next count. On the other hand, when the ECS_Flag signal is generated, the counter may still count the refresh command REF_AB continuously until the ECS_RST, and then re-count, thus the ECS_RST may conflict with operation of the counter in terms of time. Therefore, the embodiments of the disclosure may further improve the counting control circuit.

Figure 17:
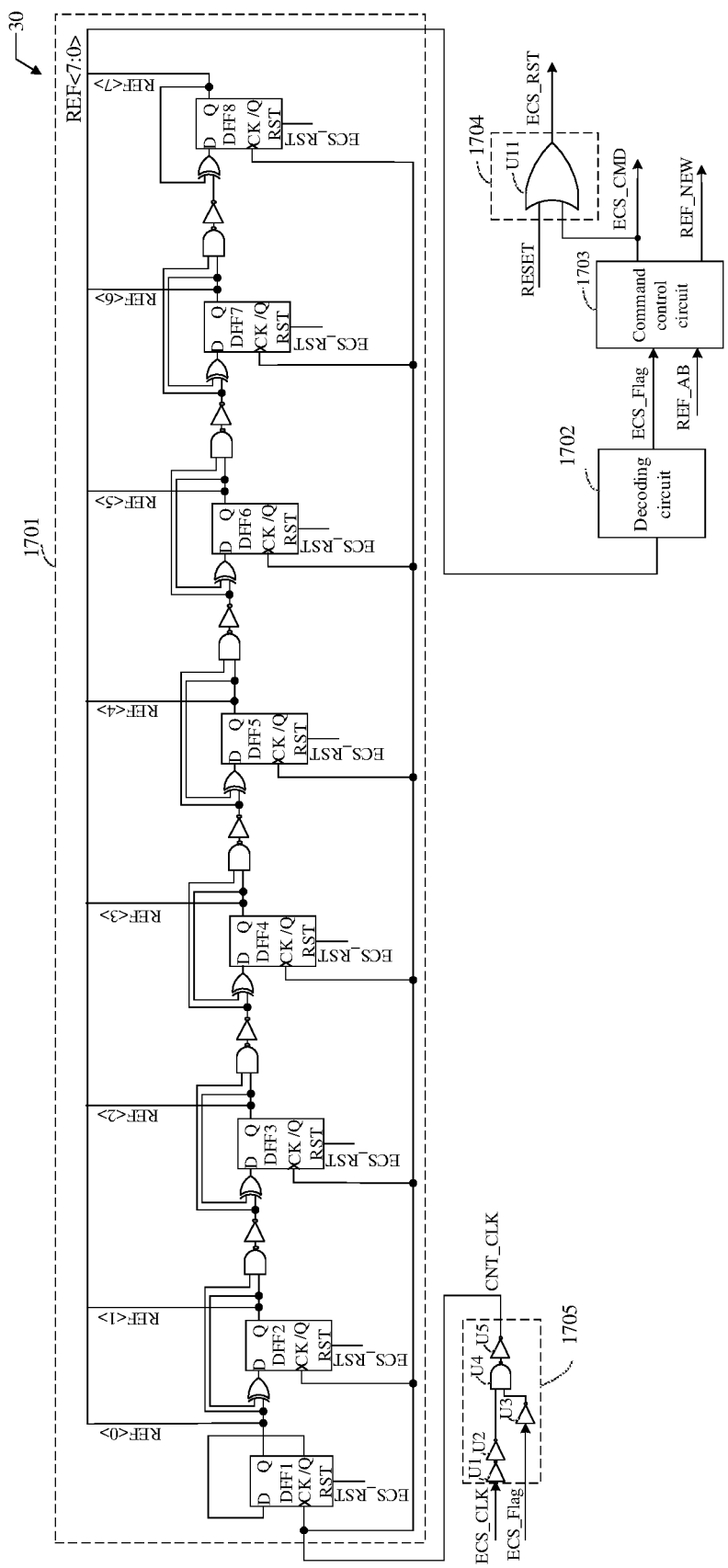
FIG. 17 is a twelfth schematic diagram of a compositional structure of a counting control circuit according to an embodiment of the disclosure.

In yet another embodiment of the disclosure, based on the counting control circuit 30 described in the foregoing embodiments, with reference to FIG. 17, a schematic diagram of a compositional structure of yet another counting control circuit 30 according to an embodiment of the disclosure is shown. As shown in FIG. 17, the counting control circuit 30 may include a synchronous counter 1701, a decoding circuit 1702, a command control circuit 1703, a reset logic circuit 1704, and a logic control circuit 1705 which is composed of a first NOT gate U1, a second NOT gate U2, a third NOT gate U3, a first NAND gate U4 and a fourth NOT gate U5, and the reset logic circuit 1704 is composed of a first OR gate U11.

Here, a counting clock signal of the synchronization counter 1701 is a CNT_CLK signal, which is not a refresh command REF_AB any more, instead, generated after performing a logical operation on an ECS_CLK signal and an ECS_Flag signal by the logic control circuit 1705. In this way, the counting clock signal is controlled by the ECS_Flag signal through the logical operation, and the counter may stop working when the ECS_Flag signal is at a high level, thereby reducing power consumption. Furthermore, during counting, the synchronization counter 1701 counts according to the CNT_CLK signal, and an output counting signal may be represented by Code<7:0> or REF<7:0>. REF<7:0> is taken as an example, the REF<7:0> signal is used here to characterize a counting value. When the counting value meets a preset condition, the REF<7:0> signal at this point may be decoded by the decoding circuit 1702 to obtain the ECS_Flag signal in a valid state. The ECS_Flag signal is transmitted to the command control circuit 1703, a refresh command REF_AB received at a next time may be acquired in the command control circuit 1703, and an ECS_CMD signal may be generated according to the refresh command REF_AB. At this point, an external reset signal RESET and the ECS_CMD signal may also be input to the reset logic circuit 1704, and subjected to an OR logical operation performed by the first OR gate U11 within the reset logic circuit 1704, then a counting reset signal ECS_RST may be output, so that the synchronous counter 1701 may restart counting, while the ECS_Flag signal may be reset to an invalid state. Furthermore, it should also be noted that in the command control circuit 1703, if the ECS_Flag signal is in the invalid state, the acquired refresh command REF_AB may be directly output as the internal refresh signal REF_NEW at this point.

Figure 18:
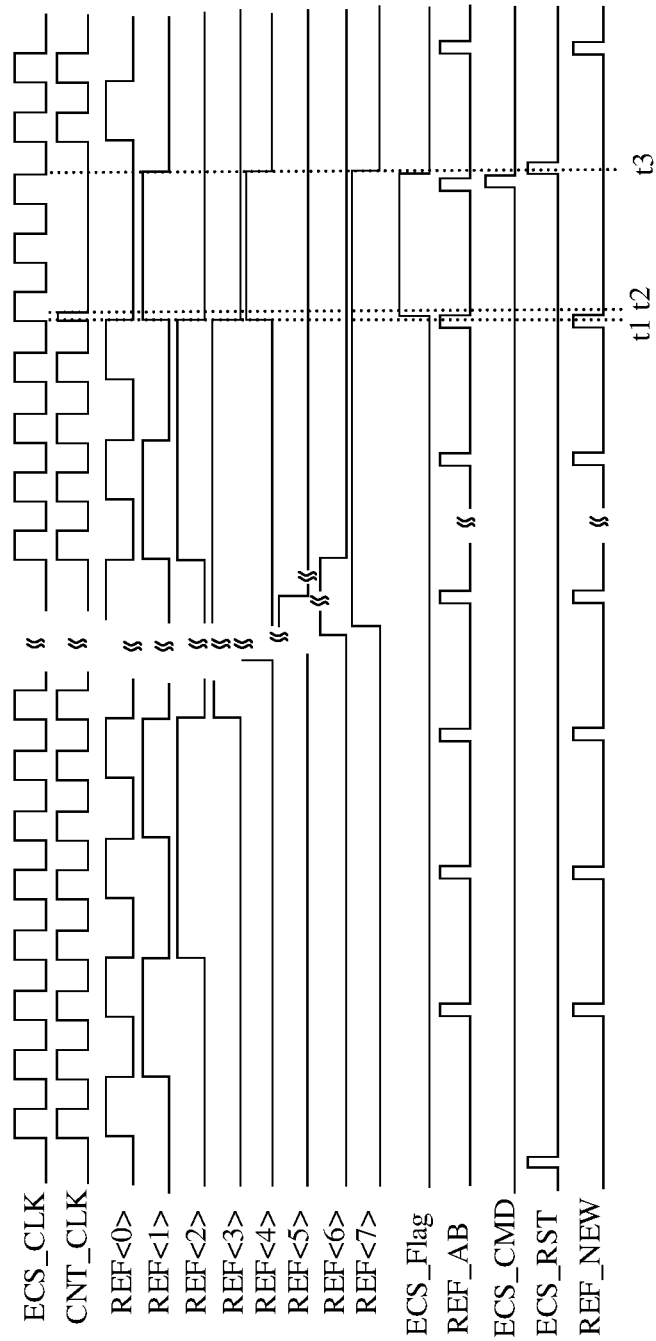
FIG. 18 is a schematic diagram of signal timing sequence of another counting control circuit according to an embodiment of the disclosure.

Based on the counting control circuit shown in FIG. 17, FIG. 18 shows a schematic diagram of signal timing sequence of another counting control circuit according to an embodiment of the disclosure. As shown in FIG. 18, REF<0>, REF<1>, REF<2>, REF<3>, REF<4>, REF<5>, REF<6>, REF<7> are eight bits included in the counting signal. Due to characteristics of the synchronous counter itself, edges of counting output of the synchronous counter are aligned. At time t1 when the counting value meets the preset condition (that is, counts to a specific value), the decoding circuit may generate a valid ECS_Flag signal; in a period when ECS_Flag is at a high level, the ECS_Flag signal may control the counting clock signal through the logical to make the counting clock signal at a low level, so that the counter stops counting at time t2. Furthermore, when ECS_Flag is at the high level, a REF_AB command may also be selected to generate an ECS_CMD command, and the selected REF_AB command may not be transmitted as a REF_NEW command. Then, a counting reset signal ECS_RST may also be generated according to the ECS_CMD command, specifically, at time t3; at this time, the REF<7:0> signal may be decoded and reset to 0 according to ECS_RST, that is, REF<7:0> is 00000000; and then the ECS_Flag signal may also be reset to a low level. In a period when the ECS_Flag signal is at the low level, the refresh command may not be stolen and may be directly transmitted as the REF_NEW signal, and the performed refresh operation is not affected. Here, the invalid state (low level state) of the ECS_Flag signal may be that the ECS_Flag signal may be directly controlled to be in the invalid state according to the ECS_CMD signal; or, the ECS_RST signal may be generated according to the ECS_CMD signal to reset the counter, and then the ECS_Flag signal may be in the invalid state according to the reset counting value.

That is, with regard to the counting control circuit shown in FIG. 17, the asynchronous counter is changed into the synchronous counter, the OSC_CLK signal with a fixed frequency is generated by an oscillator, and then the ECS_CLK signal is generated by a frequency divider as a clock signal of the synchronous counter; when the count reaches a specific value, output of the synchronous counter passes through a decoder to generate the ECS_Flag signal. Then, the ECS_Flag signal passes through the command control circuit, a next refresh command REF_AB will be selected to generate the ECS command, while the correspondingly selected REF_AB is not used for performing the refresh operation. Then, the command control circuit generates the counting reset signal to make the counter restart counting, while the ECS_Flag signal is reset to the low level. In a period when the ECS_Flag signal is at the low level, the refresh command REF_AB may not be selected and may be directly transmitted as the REF_NEW signal, to perform a normal refresh operation.

The embodiment of the disclosure provides a counting control circuit, and specific implementations of the foregoing embodiments are described in detail through the above embodiment. It may be seen therefrom that based on the technical solutions of the foregoing embodiments, on one hand, a problem that the complete ECS operation cannot be completed within 24 hours since the controller transmits other commands other than REF_AB may be solved; on the other hand, output at each stage may be aligned by adopting the synchronous counter, to ensure that an erroneous decoding process is not present in the output of the counter, thereby reducing influence of the delay of the counter on the ECS_Flag signal; moreover, the ECS_Flag signal controls the counting clock signals through some logics, specifically, the counter may stop working when ECS_Flag is at the high level, thereby reducing power consumption; furthermore, the counter may be reset after the ECS_CMD signal is generated. Since the counter has stopped working, a problem of conflict due to simultaneous counting and resetting operations may not occur at this point.

Figure 19:
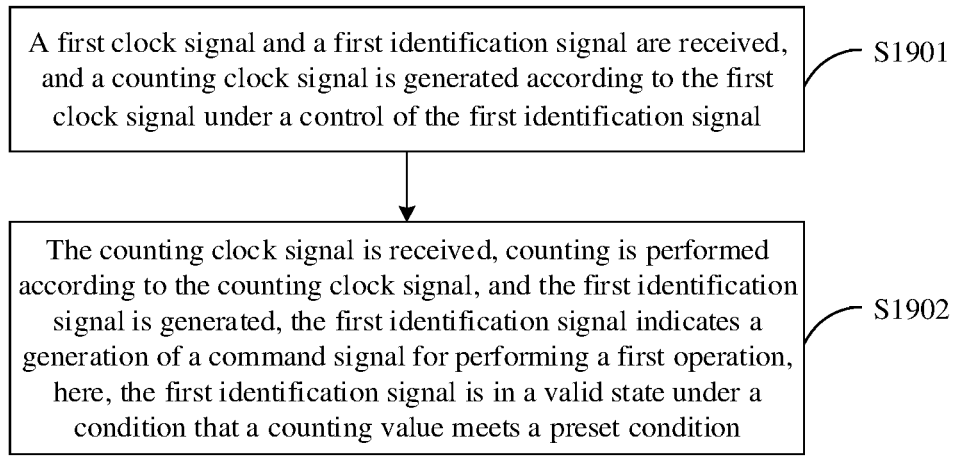
FIG. 19 is a schematic flowchart of a counting control method according to an embodiment of the disclosure.

In yet another embodiment of the disclosure, with reference to FIG. 19, a schematic flowchart of a counting control method according to an embodiment of the disclosure is shown. As shown in FIG. 19, the flow may include the following operations.

At operation S1901, a first clock signal and a first identification signal are received, and a counting clock signal is generated according to the first clock signal under a control of the first identification signal.

At operation S1902, counting is performed according to the counting clock signal, and the first identification signal is generated, the first identification signal indicates a generation of a command signal for performing a first operation, here, the first identification signal is in a valid state under a condition that a counting value meets a preset condition.

It should be noted that in the embodiment of the disclosure, the method may be applied to the counting control circuit 30 described in any one of the foregoing embodiments, or a semiconductor memory integrated with the counting control circuit 30. The counting control circuit 30 may include a logic control circuit and a counting statistic circuit, an output terminal of the logic control circuit is connected to an input terminal of the counting statistic circuit. The operation S1901 is performed by the logic control circuit, and the operation S1902 is performed by the counting statistic circuit.

In some embodiments, the method may further include the following operations.

Under a condition that the first identification signal is in an invalid state, the counting clock signal is generated according to the first clock signal, to make the counting statistic circuit to count the counting clock signal.

Or, under a condition that the first identification signal is in the valid state, the first clock signal is shielded, to prevent a generation of the counting clock signal and make the counting statistic circuit to stop counting.

In the embodiments of the disclosure, the logic control circuit may include a first driving circuit and a first logic circuit. Accordingly, in some embodiments, with regard to the operation S1901, the first clock signal and the first identification signal are received by the logic control circuit, and the counting clock signal is generated by the logic control circuit according to the first clock signal under a control of the first identification signal, which may include the following operations.

Driving on the first clock signal is performed by the first driving circuit, to obtain a first intermediate signal.

A logical operation on the first intermediate signal and the first identification signal is performed by the first logic circuit, to obtain the counting clock signal.

In the embodiments of the disclosure, the first driving circuit may include an even number of cascaded first NOT gates.

In the embodiments of the disclosure, the first logic circuit may include a first delay inverting circuit, a first NAND gate, and a second NOT gate. Accordingly, in some embodiments, the operation of performing the logical operation on the first intermediate signal and the first identification signal by the first logic circuit to obtain the counting clock signal may include the following operations.

The first identification signal is delayed and inverted by the first delay inverting circuit, to obtain a second intermediate signal.

A NAND logical operation on the first intermediate signal and the second intermediate signal is performed by the first NAND gate, to obtain a third intermediate signal.

A NOT logical operation on the third intermediate signal is performed by the second NOT gate, to obtain the counting clock signal.

In the embodiments of the disclosure, the first delay inverting circuit includes an odd number of cascaded third NOT gates.

It may be understood that in the embodiments of the disclosure, the counting statistic circuit may include a counting circuit and a decoding circuit. Accordingly, in some embodiments, with regard to the operation S1902, the counting clock signal is received by the counting statistic circuit, counting is performed by the counting statistic circuit according to the counting clock signal, and the first identification signal is generated by the counting statistic circuit, which may include the following operations.

The counting clock signal is received by the counting circuit, counting is performed by the counting circuit according to the counting clock signal, and a counting signal is generated by the counting circuit, the counting signal characterizes the counting value.

The counting signal is received by the decoding circuit, the counting signal is decoded by the decoding circuit, and the first identification signal is generated by the decoding circuit, here, the first identification signal is in the valid state under the condition that the counting value meets the preset condition.

It may also be understood that in the embodiments of the disclosure, the counting circuit may include a synchronous binary counter which includes multiple counting sub-circuits cascaded sequentially, each of the counting sub-circuits includes a flip-flop, and a clock terminal of each flip-flop is configured to receive the counting clock signal. Accordingly, in some embodiments, the method may further include the following operations.

The counting clock signal is received by multiple counting sub-circuits, clock sampling is performed through respective flip-flops contained therein, and the counting signal is output by multiple counting sub-circuits. The counting signal includes multiple bits, and correspondences are present between multiple counting sub-circuits and multiple bits contained in the counting signal.

Furthermore, in some embodiments, multiple counting sub-circuits may include a first counting sub-circuit, a second counting sub-circuit, and an i-th counting sub-circuit.

The first counting sub-circuit includes a first flip-flop, an input terminal (D) of the first flip-flop is connected to a second output terminal (/Q) of the first flip-flop, a clock terminal (CK) of the first flip-flop is configured to receive the counting clock signal, and a first output terminal (Q) of the first flip-flop is configured to output a first counting signal which is a zero-th bit in the counting signal.

The second counting sub-circuit includes a second flip-flop and a second XOR gate, a first input terminal of the second XOR gate is connected to the first output terminal (Q) of the first flip-flop, a second input terminal of the second XOR gate is connected to a first output terminal (Q) of the second flip-flop, an output terminal of the second XOR gate is connected to an input terminal (D) of the second flip-flop, a clock terminal (CK) of the second flip-flop is configured to receive the counting clock signal, and the first output terminal (Q) of the second flip-flop is configured to output a second counting signal which is a first bit in the counting signal.

The i-th counting sub-circuit includes an i-th flip-flop, an i-th NAND gate, an i-th NOT gate and an i-th XOR gate, a first input terminal of the i-th NAND gate is connected to a first output terminal (Q) of a (i−1)-th flip-flop, a second input terminal of the i-th NAND gate is connected to a first input terminal of a (i−1)-th XOR gate, an output terminal of the i-th NAND gate is connected to an input terminal of the i-th NOT gate, an output terminal of the i-th NOT gate is connected to a first input terminal of the i-th XOR gate, a second input terminal of the i-th XOR gate is connected to a first output terminal (Q) of the i-th flip-flop, an output terminal of the i-th XOR gate is connected to an input terminal (D) of the i-th flip-flop, a clock terminal (CK) of the i-th flip-flop is configured to receive the counting clock signal, and the first output terminal (Q) of the i-th flip-flop is configured to output an i-th counting signal which is a (i−1)-th bit in the counting signal, here, i is an integer greater than or equal to 3 and less than or equal to M, and M is a positive integer.

It may also be understood that in the embodiments of the disclosure, the counting control circuit may further include a command control circuit. Accordingly, in some embodiments, the method may further include the following operations.

The first identification signal and a refresh command signal are received by the command control circuit, and a first command signal is generated by the command control circuit according to the refresh command signal under a condition that the first identification signal is in the valid state, or a second command signal is generated by the command control circuit according to the refresh command signal under a condition that the first identification signal is in an invalid state.

In the embodiments of the disclosure, the first command signal is an ECS command signal for performing an ECS operation, and the second command signal is an internal refresh signal for performing a refresh operation.

In the embodiments of the disclosure, the refresh command signal may include a refresh signal and/or a self-refresh signal.

Furthermore, in some embodiments, the method may further include the following operations.

A counting reset signal is received by the counting statistic circuit, the count is reset by the counting statistic circuit according to the counting reset signal, and the first identification signal is put in an invalid state by the counting statistic circuit.

It may also be understood that in the embodiments of the disclosure, the counting control circuit may further include a reset logic circuit. Accordingly, in some embodiments, the method may further include the following operations.

A first command signal and an external reset signal are received by the reset logic circuit, a logical operation on the first command signal and the external reset signal is performed by the reset logic circuit, and the counting reset signal is generated by the reset logic circuit, the counting reset signal is transmitted to the counting statistic circuit, here, the first identification signal indicates a generation of the first command signal under the condition that the first identification signal is in the valid state, and the first command signal is used for characterizing a command signal generated when the first operation is an ECS operation.

Furthermore, in some embodiments, the reset logic circuit may include a first OR gate. A first input terminal of the first OR gate is configured to receive the external reset signal, a second input terminal of the OR gate is configured to receive the first command signal, and an output terminal of the OR gate is configured to output the counting reset signal.

It may also be understood that in the embodiments of the disclosure, the counting control circuit may further include a clock generation circuit. Accordingly, in some embodiments, the method may further include the following operations. The first clock signal is generated by the clock generation circuit.

Furthermore, the clock generation circuit may include an oscillation circuit and a frequency division circuit. Accordingly, in some embodiments, the method may further include the following operations.

A second clock signal with a preset frequency is output by the oscillation circuit.

n-frequency division on the second clock signal is performed by the frequency division circuit, to obtain the first clock signal.

In the embodiments of the disclosure, a frequency of the first clock signal is one n-ths of the preset frequency, n is an integer greater than zero.

The embodiments of the disclosure provide a counting control method, which may not only solve a problem that the complete ECS operation cannot be completed within 24 hours since the controller transmits other commands other than REF_AB (when counting is performed by using the REF_AB command, to generate the ECS command signal), but also output at each stage may be aligned by adopting the synchronous counter, to ensure that an erroneous decoding process is not present in the output of the counter, thereby reducing influence of the delay of the counter on the ECS_Flag signal; moreover, when ECS_Flag is at the high level, the counter is controlled by logic operations on the ECS_Flag signal to stop working, thereby reducing power consumption; furthermore, the counter may be reset after the ECS_CMD signal is generated. Since the counter has stopped working, a problem of conflict due to simultaneous counting and resetting operations will not occur at this point.

Figure 20:
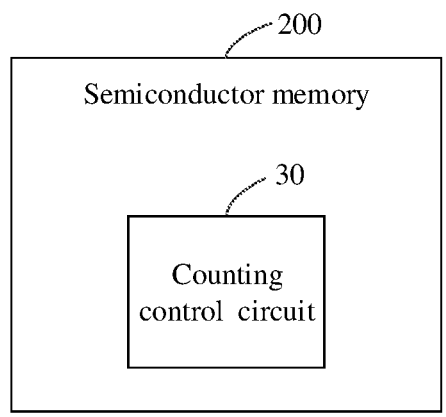
FIG. 20 is a schematic diagram of a compositional structure of a semiconductor memory according to an embodiment of the disclosure.

In yet another embodiment of the disclosure, with reference to FIG. 20, a schematic diagram of a compositional structure of a semiconductor memory according to an embodiment of the disclosure is shown. As shown in FIG. 20, the semiconductor memory 200 includes at least the counting control circuit 30 described in any one of the foregoing embodiments.

In some embodiments, the semiconductor memory 200 may include a DRAM. The DRAM may not only meet memory specifications such as DDR, DDR2, DDR3, DDR4, DDR5, or the like, but also meet memory specifications such as Low Power Double Data Rate (LPDDR), LPDDR2, LPDDR3, LPDDR4, LPDDR5, or the like, which are not limited in any way here.

In the embodiments of the disclosure, the semiconductor memory 200 mainly relates to relevant circuits of counting and command decoding of the integrated circuit counter, especially relates to: in the DRAM chip, the oscillator outputs the OSC_CLK signal, and then the OSC_CLK signal is processed by the frequency divider to generate the ECS_CLK signal as the clock signal of the counter, and the external input RESET is used as an initial value of the counter, and the counter is reset when the ECS command is generated. The embodiments of the disclosure perform optimization, the refresh command REF_AB is originally used as a clock, and the asynchronous counter is replaced by the synchronous counter, so that the counter does not affect the count due to change of the refresh command, and the counting error due to the output delay of the asynchronous counter is avoided by replacing asynchronization by synchronization. Furthermore, the embodiments of the disclosure optimize the decoding circuit, so that the decoding circuit does not induce error of the ECS command due to change of the refresh command. In the embodiments of the disclosure, the counting control circuit is applied to relevant circuits of the ECS command generated by counting in the DRAM chip, but is not limited to this range, and other circuits which generate commands by counting may use this design.

In this way, the semiconductor memory 200 may not only solve a problem that the complete ECS operation cannot be completed within 24 hours since the controller transmits other commands other than REF_AB, but also output at each stage may be aligned by adopting the synchronous counter, to ensure that an erroneous decoding process is not present in the output of the counter, thereby reducing influence of the delay of the counter on the ECS_Flag signal; moreover, when ECS_Flag is at the high level, the counter is controlled through logic operations on the ECS_Flag signal to stop working, thereby reducing power consumption; furthermore, the counter may be reset after the ECS_CMD signal is generated. Since the counter has stopped working, a problem of conflict due to simultaneous counting and resetting operations may not occur at this point.

The above descriptions are only exemplary embodiments of the disclosure, and are not intended to limit the scope of protection of the disclosure.

It should be noted that in the disclosure, terms "include", "including" or any other variants thereof are intended to cover non-exclusive inclusion, so that a process, method, article or device including a series of elements not only includes those elements, but also includes other elements which are not explicitly listed, or elements inherent to such process, method, article or device. In the absence of more limitations, an element defined by a phrase "includes a . . . " does not preclude existence of other same elements in the process, method, article or device including this element.

Serial numbers of the above embodiments of the disclosure are merely for description, and do not represent advantages and disadvantages of the embodiments.

Methods disclosed in several method embodiments provided in the disclosure may be arbitrarily combined without conflict, to obtain a new method embodiment.

Features disclosed in several product embodiments provided in the disclosure may be arbitrarily combined without conflict, to obtain a new product embodiment.

Features disclosed in several method or circuit embodiments provided in the disclosure may be arbitrarily combined without conflict, to obtain a new method or circuit embodiment.

The above descriptions are merely specific implementations of the disclosure, however, the scope of protection of the disclosure is not limited thereto. Any variation or replacement apparent to those skilled in the art within the technical scope disclosed by the disclosure shall fall within the scope of protection of the disclosure. Therefore, the scope of protection of the disclosure shall be subjected to the scope of protection of the claims.

Embodiments of the disclosure provide a counting control circuit, a counting control method, and a semiconductor memory. The counting control circuit includes a logic control circuit and a counting statistic circuit, an output terminal of the logic control circuit is connected to a clock terminal of the counting statistic circuit. The logic control circuit is configured to receive a first clock signal and a first identification signal, and generate a counting clock signal according to the first clock signal under a control of the first identification signal. The counting statistic circuit is configured to receive the counting clock signal, count according to the counting clock signal, and generate the first identification signal which indicates a generation of a command signal for performing a first operation, here, the first identification signal is in a valid state under a condition that a counting value meets a preset condition. In this way, after receiving the first clock signal, the logic control circuit performs a logical operation in combination with the first identification signal, to obtain the counting clock signal for counting, and the first identification signal may be generated according to the counting clock signal, to generate the command signal for performing the first operation. At this point, a generation of commands for performing ECS operations is not limited by refresh commands, which solves a technical problem that counting may be performed by means of REF_AB only to generate ECS command signals in the related art, and may ensure that the complete ECS operation is completed within 24 hours. Furthermore, a logical relationship is present between the counting clock signal and the first identification signal, the counting statistic circuit may be controlled to stop counting or not according to a state of the first identification signal, thereby achieving a purpose of reducing power consumption and finally improving performance of the memory.

What is claimed is:

1. A counting control circuit, comprising a logic control circuit and a counting statistic circuit, an output terminal of the logic control circuit connected to a clock terminal of the counting statistic circuit,
    wherein the logic control circuit is configured to receive a first clock signal and a first identification signal, and generate a counting clock signal according to the first clock signal under a control of the first identification signal, and
    the counting statistic circuit is configured to receive the counting clock signal, count according to the counting clock signal, and generate the first identification signal, wherein the first identification signal indicates a generation of a command signal for performing a first operation, and the first identification signal is in a valid state under a condition that a counting value meets a preset condition;
    wherein the logic control circuit comprises:
    a first driving circuit, configured to perform driving on the first clock signal, to obtain a first intermediate signal; and
    a first logic circuit, configured to perform a logical operation on the first intermediate signal and the first identification signal, to obtain the counting clock signal;
    wherein the first logic circuit comprises:
    a first delay inverting circuit, configured to delay and invert the first identification signal, to obtain a second intermediate signal;
    a first NAND gate, configured to perform a NAND logical operation on the first intermediate signal and the second intermediate signal, to obtain a third intermediate signal; and
    a second NOT gate, configured to perform a NOT logical operation on the third intermediate signal, to obtain the counting clock signal.

2. The counting control circuit of claim 1, wherein
    the logic control circuit is configured to: under a condition that the first identification signal is in an invalid state, generate the counting clock signal according to the first clock signal, and make the counting statistic circuit to count the counting clock signal; or under a condition that the first identification signal is in the valid state, shield the first clock signal to prevent a generation of the counting clock signal and make the counting statistic circuit to stop counting.

3. The counting control circuit of claim 1, wherein the first driving circuit comprises an even number of cascaded first NOT gates.

4. The counting control circuit of claim 1, wherein the first delay inverting circuit comprises an odd number of cascaded third NOT gates.

5. The counting control circuit of claim 1, wherein the counting statistic circuit is further configured to:
    receive a counting reset signal, reset the count according to the counting reset signal, and put the first identification signal in an invalid state.

6. The counting control circuit of claim 5, further comprising:
    a reset logic circuit, configured to receive a first command signal and an external reset signal, perform a logical operation on the first command signal and the external reset signal, and generate the counting reset signal to be transmitted to the counting statistic circuit, wherein the first identification signal indicates a generation of the first command signal under the condition that the first identification signal is in the valid state.

7. The counting control circuit of claim 6, wherein the reset logic circuit comprises a first OR gate, and
    a first input terminal of the first OR gate is configured to receive the external reset signal, a second input terminal of the first OR gate is configured to receive the first command signal, and an output terminal of the first OR gate is configured to output the counting reset signal.

8. The counting control circuit of claim 1, wherein the counting statistic circuit comprises a counting circuit and a decoding circuit, an output terminal of the counting circuit is connected to an input terminal of the decoding circuit,
    the counting circuit is configured to receive the counting clock signal, count according to the counting clock signal, and generate a counting signal used for characterizing the counting value,
    the decoding circuit is configured to receive the counting signal, decode the counting signal, and generate the first identification signal, wherein the first identification signal is in the valid state under the condition that the counting value meets the preset condition.

9. The counting control circuit of claim 8, wherein the counting circuit comprises a synchronous binary counter, the synchronous binary counter comprises a plurality of counting sub-circuits cascaded sequentially, each of the plurality of counting sub-circuits comprises a flip-flop, and a clock terminal of each flip-flop is configured to receive the counting clock signal,
    the plurality of counting sub-circuits are configured to receive the counting clock signal, perform clock sampling through flip-flops respectively comprised in the plurality of counting sub-circuits, and output the counting signal, the counting signal comprises a plurality of bits, and there exists one-to-one correspondences between the plurality of counting sub-circuits and the plurality of bits comprised in the counting signal.

10. The counting control circuit of claim 9, wherein among the plurality of counting sub-circuits:
a first counting sub-circuit comprises a first flip-flop, an input terminal of the first flip-flop is connected to a second output terminal of the first flip-flop, a clock terminal of the first flip-flop is configured to receive the counting clock signal, and a first output terminal of the first flip-flop is configured to output a first counting signal, and the first counting signal is a 0-th bit in the counting signal;
a second counting sub-circuit comprises a second flip-flop and a second XOR gate, a first input terminal of the second XOR gate is connected to the first output terminal of the first flip-flop, a second input terminal of the second XOR gate is connected to a first output terminal of the second flip-flop, an output terminal of the second XOR gate is connected to an input terminal of the second flip-flop, a clock terminal of the second flip-flop is configured to receive the counting clock signal, and the first output terminal of the second flip-flop is configured to output a second counting signal, and the second counting signal is a first bit in the counting signal; and
an i-th counting sub-circuit comprises an i-th flip-flop, an i-th NAND gate, an i-th NOT gate and an i-th XOR gate, a first input terminal of the i-th NAND gate is connected to a first output terminal of a (i−1)-th flip-flop, a second input terminal of the i-th NAND gate is connected to a first input terminal of a (i−1)-th XOR gate, an output terminal of the i-th NAND gate is connected to an input terminal of the i-th NOT gate, an output terminal of the i-th NOT gate is connected to a first input terminal of the i-th XOR gate, a second input terminal of the i-th XOR gate is connected to a first output terminal of the i-th flip-flop, an output terminal of the i-th XOR gate is connected to an input terminal of the i-th flip-flop, a clock terminal of the i-th flip-flop is configured to receive the counting clock signal, and the first output terminal of the i-th flip-flop is configured to output an i-th counting signal, and the i-th counting signal is a (i−1)-th bit in the counting signal, wherein i is an integer greater than or equal to 3 and less than or equal to M, and M is a positive integer.

11. The counting control circuit of claim 1, further comprising:
a command control circuit, configured to receive the first identification signal and a refresh command signal, and generate a first command signal according to the refresh command signal under a condition that the first identification signal is in the valid state, or generate a second command signal according to the refresh command signal under a condition that the first identification signal is in an invalid state.

12. The counting control circuit of claim 11, wherein the first command signal is an Error Check and Scrub (ECS) command signal for performing an ECS operation, and
the second command signal is an internal refresh signal for performing a refresh operation.

13. The counting control circuit of claim 11, wherein the refresh command signal comprises at least one of a refresh signal or a self-refresh signal.

14. The counting control circuit of claim 1, further comprising:
a clock generation circuit, configured to generate the first clock signal.

15. The counting control circuit of claim 14, wherein the clock generation circuit comprises:
an oscillation circuit, configured to output a second clock signal with a preset frequency; and
a frequency division circuit, configured to perform n-frequency division on the second clock signal, to obtain the first clock signal,
wherein a frequency of the first clock signal is one n-ths of the preset frequency, n is an integer greater than zero.

16. A counting control method, applied to the counting control circuit according to claim 1, comprising:
receiving the first clock signal and the first identification signal, and generating the counting clock signal according to the first clock signal under the control of the first identification signal; and
counting according to the counting clock signal, and generating the first identification signal, wherein the first identification signal indicates the generation of the command signal for performing the first operation, and the first identification signal is in the valid state under the condition that the counting value meets the preset condition.

17. A semiconductor memory, comprising a counting control circuit, wherein the counting control circuit comprises a logic control circuit and a counting statistic circuit, an output terminal of the logic control circuit is connected to a clock terminal of the counting statistic circuit,
the logic control circuit is configured to receive a first clock signal and a first identification signal, and generate a counting clock signal according to the first clock signal under a control of the first identification signal, and
the counting statistic circuit is configured to receive the counting clock signal, count according to the counting clock signal, and generate the first identification signal, wherein the first identification signal indicates a generation of a command signal for performing a first operation, and the first identification signal is in a valid state under a condition that a counting value meets a preset condition;
wherein the logic control circuit comprises:
a first driving circuit, configured to perform driving on the first clock signal, to obtain a first intermediate signal; and
a first logic circuit, configured to perform a logical operation on the first intermediate signal and the first identification signal, to obtain the counting clock signal;
wherein the first logic circuit comprises:
a first delay inverting circuit, configured to delay and invert the first identification signal, to obtain a second intermediate signal;
a first NAND gate, configured to perform a NAND logical operation on the first intermediate signal and the second intermediate signal, to obtain a third intermediate signal; and
a second NOT gate, configured to perform a NOT logical operation on the third intermediate signal, to obtain the counting clock signal.

18. The semiconductor memory of claim 17, comprising a Dynamic Random Access Memory (DRAM).

19. A counting control circuit, comprising a logic control circuit and a counting statistic circuit, an output terminal of the logic control circuit connected to a clock terminal of the counting statistic circuit, wherein the logic control circuit is configured to receive a first clock signal and a first identification signal, and generate a counting clock signal according to the first clock signal under a control of the first identification signal, and the counting statistic circuit is configured to receive the counting clock signal, count according to the counting clock signal, and generate the first identification signal, wherein the first identification signal indicates a generation of a command signal for performing a first operation, and the first identification signal is in a valid state under a condition that a counting value meets a preset condition;

wherein the counting statistic circuit comprises a counting circuit and a decoding circuit, an output terminal of the counting circuit is connected to an input terminal of the decoding circuit, the counting circuit is configured to receive the counting clock signal, count according to the counting clock signal, and generate a counting signal used for characterizing the counting value, the decoding circuit is configured to receive the counting signal, decode the counting signal, and generate the first identification signal, wherein the first identification signal is in the valid state under the condition that the counting value meets the preset condition;

wherein the counting circuit comprises a synchronous binary counter, the synchronous binary counter comprises a plurality of counting sub-circuits cascaded sequentially, each of the plurality of counting sub-circuits comprises a flip-flop, and a clock terminal of each flip-flop is configured to receive the counting clock signal, the plurality of counting sub-circuits are configured to receive the counting clock signal, perform clock sampling through flip-flops respectively comprised in the plurality of counting sub-circuits, and output the counting signal, the counting signal comprises a plurality of bits, and there exists one-to-one correspondences between the plurality of counting sub-circuits and the plurality of bits comprised in the counting signal.

* * * * *